(12) United States Patent
Dong

(10) Patent No.: US 12,137,372 B2
(45) Date of Patent: Nov. 5, 2024

(54) MULTI-BAND COMMUNICATION METHOD AND APPARATUS, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 338 days.

(21) Appl. No.: 17/636,337

(22) PCT Filed: Aug. 22, 2019

(86) PCT No.: PCT/CN2019/102077
§ 371 (c)(1),
(2) Date: Feb. 17, 2022

(87) PCT Pub. No.: WO2021/031209
PCT Pub. Date: Feb. 25, 2021

(65) Prior Publication Data
US 2022/0345936 A1  Oct. 27, 2022

(51) Int. Cl.
*H04W 28/04* (2009.01)
*H04W 28/02* (2009.01)

(52) U.S. Cl.
CPC ....... *H04W 28/04* (2013.01); *H04W 28/0252* (2013.01)

(58) Field of Classification Search
CPC .......................... H04W 28/04; H04W 28/0252
See application file for complete search history.

(56) References Cited

U.S. PATENT DOCUMENTS

| 8,811,310 B2 | 8/2014 | Fontaine et al. | |
| 2002/0061031 A1* | 5/2002 | Sugar | H04W 16/14 370/445 |
| 2011/0244908 A1 | 10/2011 | Moroka | |
| 2011/0249659 A1* | 10/2011 | Fontaine | H04L 1/1607 370/338 |
| 2014/0161097 A1 | 6/2014 | Morioka | |
| 2014/0341139 A1* | 11/2014 | Hu | H04L 5/0044 370/329 |
| 2015/0188675 A1* | 7/2015 | Abeysekera | H04L 5/0007 370/329 |
| 2015/0201401 A1* | 7/2015 | Lahetkangas | H04L 1/0079 370/329 |

(Continued)

FOREIGN PATENT DOCUMENTS

| CN | 102026299 A | 4/2011 |
| CN | 102326440 A | 1/2012 |
| CN | 107888225 A | 4/2018 |

OTHER PUBLICATIONS

International Search Report of PCT/CN2019/102077 dated May 9, 2020 with English translation, (4p).

(Continued)

*Primary Examiner* — Parth Patel
(74) *Attorney, Agent, or Firm* — Arch & Lake LLP

(57) ABSTRACT

A multi-band communication method, including: before sending data frames in a plurality of frequency bands, respectively determining request to send (RTS) frames that are in a preset format and correspond to each frequency band; and sending the RTS frames corresponding to each frequency band to a station.

16 Claims, 14 Drawing Sheets

(56) References Cited

U.S. PATENT DOCUMENTS

| | | | | |
|---|---|---|---|---|
| 2016/0081106 A1* | 3/2016 | Zhou | ............ | H04W 24/10 |
| | | | | 370/328 |
| 2016/0227578 A1* | 8/2016 | Lee | ............ | H04W 74/004 |
| 2017/0013645 A1* | 1/2017 | Choi | ............ | H04W 52/143 |
| 2017/0149547 A1* | 5/2017 | Kim | ............ | H04L 1/1685 |
| 2017/0164371 A1* | 6/2017 | Kim | ............ | H04W 74/0816 |
| 2017/0273111 A1* | 9/2017 | Wong | ............ | H04W 74/0816 |
| 2019/0274165 A1* | 9/2019 | Pu | ............ | H04B 7/088 |
| 2020/0128547 A1* | 4/2020 | Shi | ............ | H04B 7/0626 |
| 2021/0029552 A1* | 1/2021 | Murayama | ............ | H04W 16/14 |
| 2022/0345936 A1* | 10/2022 | Dong | ............ | H04W 74/0816 |
| 2024/0080894 A1* | 3/2024 | Murakami | ............ | H04W 74/008 |

OTHER PUBLICATIONS

The First Office Action of Corresponding Chinese application No. 201980001773.2, dated Aug. 3, 2022,(6p).

* cited by examiner

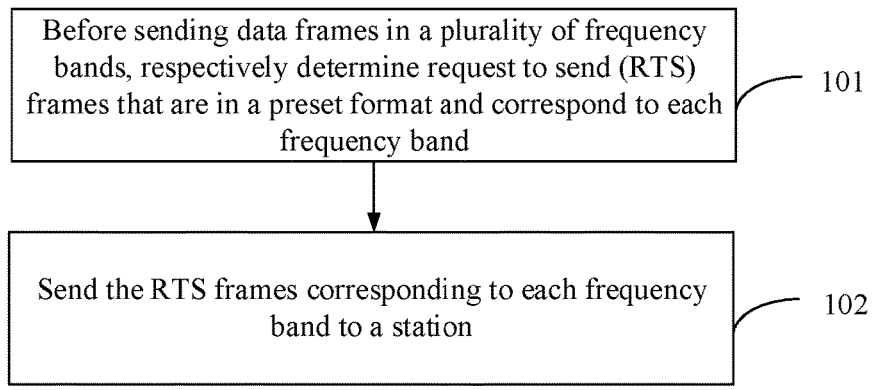
Fig. 1
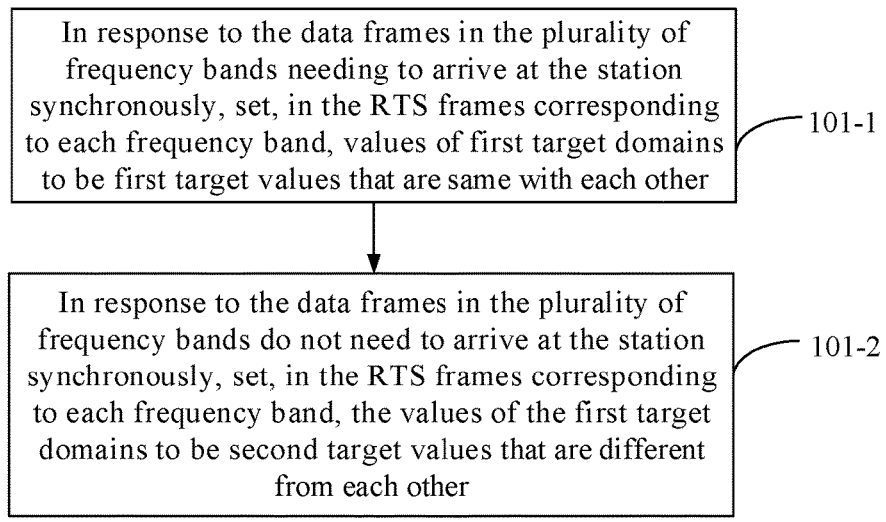
Fig. 2
Fig. 3

| RTS frame corresponding to frequency band 1 | Second target domain (first preset value) | First target domain | Receiver address | Transmitter address | Frame check sequence domain |

| RTS frame corresponding to frequency band 2 | Second target domain (first preset value) | First target domain | Receiver address | Transmitter address | Frame check sequence domain |

| RTS frame corresponding to frequency band 3 | Second target domain (first preset value) | First target domain | Receiver address | Transmitter address | Frame check sequence domain |

Fig. 8A

| RTS frame corresponding to frequency band 1 | Second target domain (second preset value) | First target domain | Receiver address | Transmitter address | Frame check sequence domain |

| RTS frame corresponding to frequency band 2 | Second target domain (second preset value) | First target domain | Receiver address | Transmitter address | Frame check sequence domain |

| RTS frame corresponding to frequency band 3 | Second target domain (second preset value) | First target domain | Receiver address | Transmitter address | Frame check sequence domain |

Fig. 8B

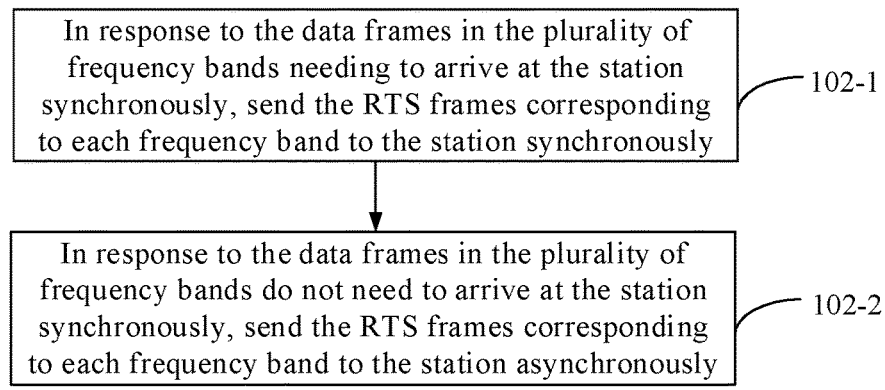

Fig. 9

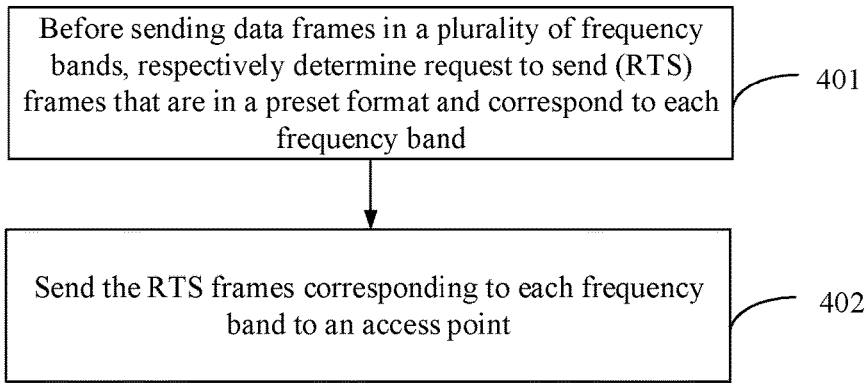

Fig. 10

| RTS frame corresponding to frequency band 1 | Second target domain | First target domain | Receiver address A1 | Transmitter address B | Frame check sequence domain |
| --- | --- | --- | --- | --- | --- |
| RTS frame corresponding to frequency band 2 | Second target domain | First target domain | Receiver address A2 | Transmitter address B | Frame check sequence domain |
| RTS frame corresponding to frequency band 3 | Second target domain | First target domain | Receiver address A3 | Transmitter address B | Frame check sequence domain |

Fig. 11

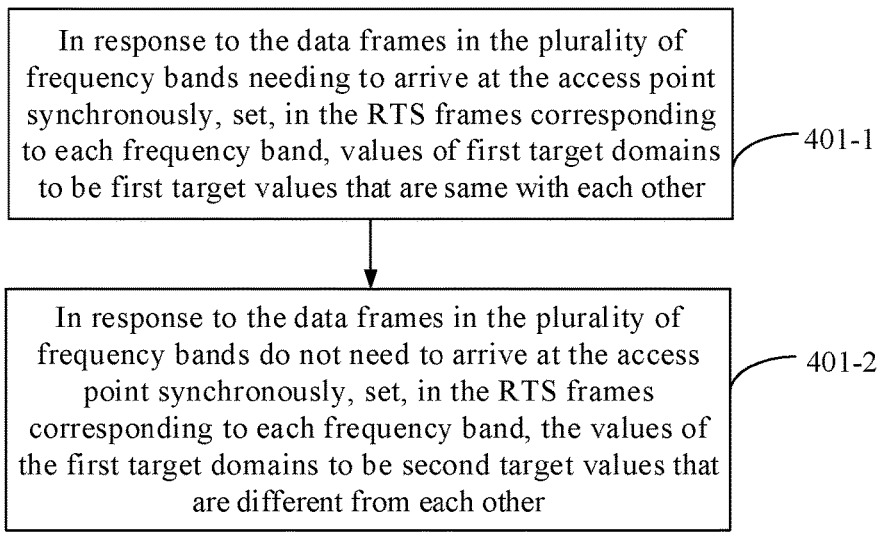

Fig. 12

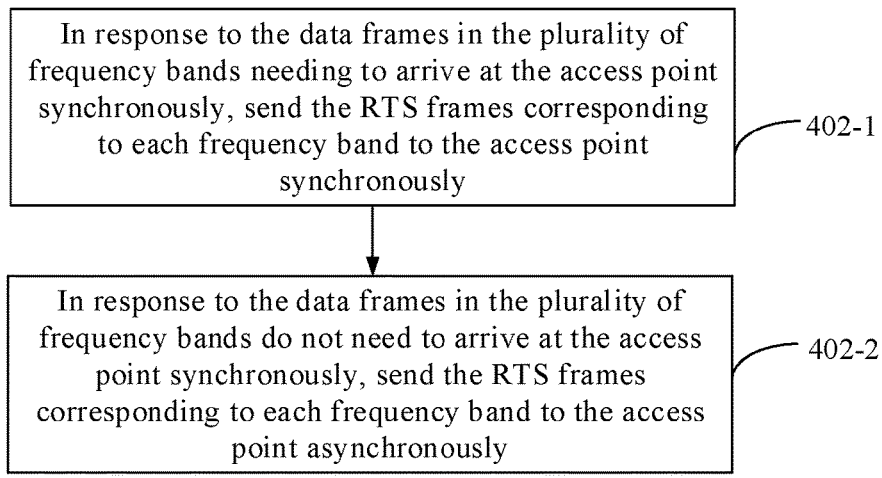

Fig. 17

| RTS frame corresponding to frequency band 1 | Second target domain (first preset value) | First target domain (first target values that are same with each other) | Receiver address A | Transmitter address B1 | Frame check sequence domain |
|---|---|---|---|---|---|
| RTS frame corresponding to frequency band 2 | Second target domain (first preset value) | First target domain (first target values that are same with each other) | Receiver address A | Transmitter address B2 | Frame check sequence domain |
| RTS frame corresponding to frequency band 3 | Second target domain (first preset value) | First target domain (first target values that are same with each other) | Receiver address A | Transmitter address B3 | Frame check sequence domain |

Fig. 18A

| RTS frame corresponding to frequency band 1 | Second target domain (second preset value) | First target domain (second target value b1) | Receiver address A | Transmitter address B1 | Frame check sequence domain |
|---|---|---|---|---|---|
| RTS frame corresponding to frequency band 2 | Second target domain (second preset value) | First target domain (second target value b2) | Receiver address A | Transmitter address B2 | Frame check sequence domain |
| RTS frame corresponding to frequency band 3 | Second target domain (second preset value) | First target domain (second target value b3) | Receiver address A | Transmitter address B3 | Frame check sequence domain |

Fig. 18B

| RTS frame corresponding to frequency band 1 | Second target domain (first preset value) | First target domain (first target values that are same with each other) | Receiver address A1 | Transmitter address B | Frame check sequence domain |
|---|---|---|---|---|---|
| RTS frame corresponding to frequency band 2 | Second target domain (first preset value) | First target domain (first target values that are same with each other) | Receiver address A2 | Transmitter address B | Frame check sequence domain |
| RTS frame corresponding to frequency band 3 | Second target domain (first preset value) | First target domain (first target values that are same with each other) | Receiver address A3 | Transmitter address B | Frame check sequence domain |

Fig. 19A

| RTS frame corresponding to frequency band 1 | Second target domain (second preset value) | First target domain (second target value b1) | Receiver address A1 | Transmitter address B | Frame check sequence domain |
|---|---|---|---|---|---|
| RTS frame corresponding to frequency band 2 | Second target domain (second preset value) | First target domain (second target value b2) | Receiver address A2 | Transmitter address B | Frame check sequence domain |
| RTS frame corresponding to frequency band 3 | Second target domain (second preset value) | First target domain (second target value b3) | Receiver address A3 | Transmitter address B | Frame check sequence domain |

Fig. 19B

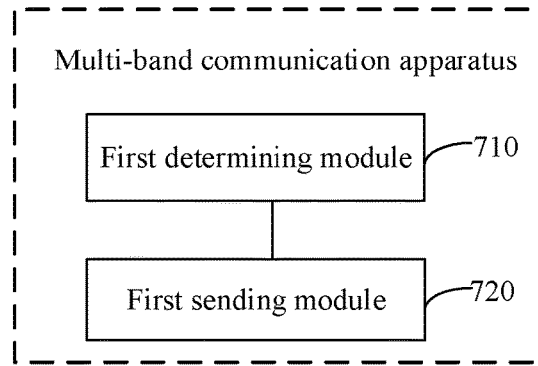

Fig. 20

MULTI-BAND COMMUNICATION METHOD AND APPARATUS, AND STORAGE MEDIUM

CROSS-REFERENCE TO RELATED APPLICATION

The present application is a U.S. National Phase Application of International Patent Application Serial No. PCT/CN2019/102077 filed on Aug. 22, 2019, the entire disclosure of which is hereby incorporated by reference in its entirety for all purposes.

BACKGROUND

At present, multi-band communication refers to simultaneous communication between devices in frequency bands of 2.4 GHz, 5.8 GHz, and 6-7 GHz.

In the related art, in order to prevent great waste of resources caused by the communication between the devices being interfered by hidden nodes, request to send (RTS) and clear to send (CTS) mechanisms are sent before the communication between the devices so as to ensure that the communication is not interfered by the hidden nodes.

SUMMARY

Examples of the disclosure provide a multi-band communication method and apparatus, and storage medium.

According to a first aspect of an example of the disclosure, a multi-band communication method is provided. The method is applied to an access point, and includes:

before sending data frames in a plurality of frequency bands, respectively determining request to send (RTS) frames that are in a preset format and correspond to each frequency band; and sending the RTS frames corresponding to each frequency band to a station.

According to a second aspect of an example of the disclosure, a multi-band communication method is provided. The method is applied to a station, and includes:

before sending data frames in a plurality of frequency bands, respectively determining request to send (RTS) frames that are in a preset format and correspond to each frequency band; and sending the RTS frames corresponding to each frequency band to an access point.

According to a third aspect of an example of the disclosure, a multi-band communication apparatus is provided. The apparatus is applied to an access point, and includes:

a processor; and a memory configured to store processor-executable instructions.

The processor is configured to:

respectively determine, before sending data frames in a plurality of frequency bands, request to send (RTS) frames that are in a preset format and correspond to each frequency band; and send the RTS frames corresponding to each frequency band to a station.

According to a fourth aspect of an example of the disclosure, a multi-band communication apparatus is provided. The apparatus is applied to a station, and includes:

a processor; and a memory configured to store processor-executable instructions.

The processor is configured to:

respectively determine, before sending data frames in a plurality of frequency bands, request to send (RTS) frames that are in a preset format and correspond to each frequency band; and send the RTS frames corresponding to each frequency band to an access point.

According to a fifth aspect of an example of the disclosure, a non-transitory computer readable storage medium is provided storing a computer instruction thereon, which, when executed by a processor, performs steps of the multi-band communication method according to the first aspect of the disclosure.

According to a sixth aspect of an example of the disclosure, a non-transitory computer readable storage medium is provided storing a computer instruction thereon, which, when executed by a processor, performs steps of the multi-band communication method according to the second aspect of the disclosure.

It should be understood that the above general descriptions and the following detailed descriptions are exemplary and explanatory only, and are not intended to limit the disclosure.

BRIEF DESCRIPTION OF THE DRAWINGS

The accompanying drawings, which are incorporated in and constitute a part of this specification, illustrate examples consistent with the disclosure and together with the specification serve to explain the principles of the disclosure.

FIG. 1 is a schematic flowchart of a multi-band communication method according to an example.

FIG. 2 is a schematic structural diagram of an RTS frame in multi-band communication according to an example.

FIG. 3 is a schematic flowchart of another multi-band communication method according to an example.

FIGS. 8A to 8B are schematic structural diagrams of an RTS frame in multi-band communication according to an example.

FIG. 9 is a schematic flowchart of yet another multi-band communication method according to an example.

FIG. 10 is a schematic flowchart of yet another multi-band communication method according to an example.

FIG. 11 is a schematic structural diagram of an RTS frame in another multi-band communication according to an example.

FIG. 12 is a schematic flowchart of yet another multi-band communication method according to an example.

FIG. 17 is a schematic flowchart of yet another multi-band communication method according to an example.

FIGS. 18A to 18B are schematic structural diagrams of an RTS frame in multi-band communication according to an example.

FIGS. 19A to 19B are schematic structural diagrams of an RTS frame in multi-band communication according to an example.

FIG. 20 is a block diagram of a multi-band communication apparatus according to an example.

DETAILED DESCRIPTION

Figure 4:
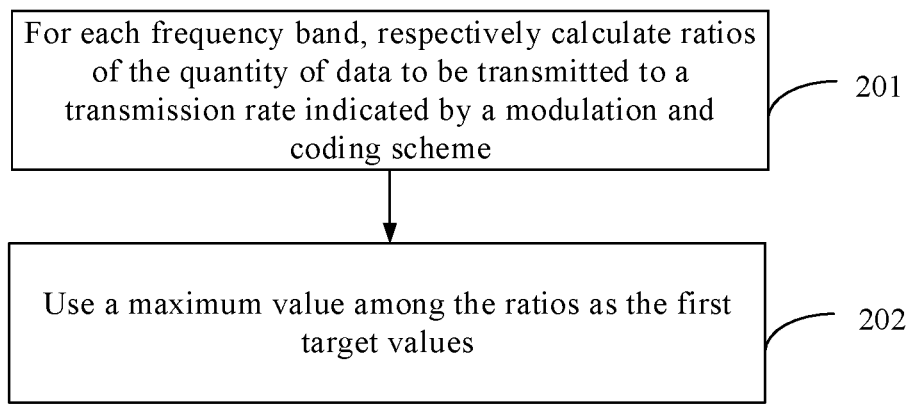
FIG. 4 is a schematic flowchart of yet another multi-band communication method according to an example.

Examples will be described in detail herein, instances of which are illustrated in the accompanying drawings. When the following description refers to the accompanying drawings, the same numbers in different drawings represent the same or similar elements unless otherwise indicated. The implementations described in the following examples do not represent all implementations consistent with the disclosure. On the contrary, they are merely examples of an apparatus and a method consistent with some aspects of the disclosure as detailed in the appended claims.

The terms used in the disclosure are for the purpose of describing particular examples only and are not intended to limit the disclosure. As used in the disclosure and the appended claims, the singular forms "a", "the" and "this" are intended to include the plural forms as well, unless the context clearly dictates otherwise. It should also be understood that the term "and/or" as used herein refers to and includes any or all possible combinations of one or more of the associated listed items.

It should be understood that although the terms first, second, third, etc. may be used in the disclosure to describe various information, such information should not be limited by these terms. These terms are only used to distinguish the same type of information from each other. For example, the first information may also be referred to as the second information, and similarly, the second information may also be referred to as the first information, without departing from the scope of the disclosure. Depending on the context, the word "if" as used herein may be interpreted as "at the time of" or "when" or "in response to determining".

In the related art, an RTS mechanism only prevents the existence of hidden nodes in one frequency band, and cannot be used in multi-band communication In order to solve this problem, the disclosure provides a multi-band communication method and apparatus.

The multi-band communication method provided by an example of the disclosure will be described below from an access point side.

The example of the disclosure provides the multi-band communication method, which may be applied to an access point (AP), such as a terminal. Referring to FIG. 1, FIG. 1 is a flowchart of the multi-band communication method according to an example. The method may include the following steps:

In step 101, before data frames in a plurality of frequency bands are sent, request to send (RTS) frames that are in a preset format and correspond to each frequency band are respectively determined.

In the example of the disclosure, the access point and a station may pre-define in a protocol, the preset format of the RTS frames sent during multi-band communication. Before sending the data frames in the plurality of frequency bands, the access point firstly sends the RTS frames corresponding to each frequency band, and at this time, the access point may determine the RTS frames corresponding to each frequency band by using the preset format in the protocol.

In step 102, the RTS frames corresponding to each frequency band are sent to the station.

After the station receives the RTS frames, if the RTS frames meet the preset format in the protocol, the station may determine that it is currently in multi-band communication with the access point.

In the above example, the purpose of preventing, during the multi-band communication, hidden nodes from interfering with a communication requirement by means of an RTS mechanism is achieved, and the throughput of a system is improved.

In an example, the access point is used as a transmitter, and determines the RTS frames that are in the preset format and correspond to each frequency band, before sending the data frames in the plurality of frequency bands. Because basic service sets (BSSs) formed when the AP is working in different frequency bands are different, transmitter addresses corresponding to the plurality of frequency bands are also different when the AP is used as the transmitter.

In the example of the disclosure, transmitter addresses that are different from each other and receiver addresses that are same with each other may be set in the RTS frames corresponding to each frequency band. The receiver addresses may all be an address of the station.

For example, when the access point is used as the transmitter, structures of the RTS frames are as shown in FIG. 2. No matter whether the AP and the station are in multi-band synchronous communication or multi-band asynchronous communication, the access point sets transmitter addresses that are different from each other in RTS frames corresponding to three frequency bands, namely B1, B2 and B3, and sets receiver addresses A that are same with each other in the RTS frames corresponding to the three frequency bands.

In an example, the access point may randomly generate the transmitter addresses that are different from each other in the RTS frames corresponding to each frequency band.

In an example, referring to FIG. 3, FIG. 3 is a flowchart of another multi-band communication method according to the example shown in FIG. 1. Step 101 may include:

In step 101-1, in response to the data frames in the plurality of frequency bands needing to arrive at the station synchronously, values of first target domains are set, in the RTS frames corresponding to each frequency band, to be first target values that are same with each other.

When multi-frequency synchronous communication is required, the access point needs to set, in the RTS frames corresponding to each frequency band, the values of the first target domains to be the first target values that are same with each other. The first target domain is a domain configured to represent a duration value of the RTS frame, for example, it may be a duration domain. In this way, the data frames corresponding to the plurality of frequency bands sent synchronously may arrive at the station synchronously.

In the above example, in response to the data frames in the plurality of frequency bands needing to arrive at the station synchronously, the access points set the values of the first target domains to be the first target values that are same with each other so as to ensure that the data frames corresponding to the plurality of frequency bands may arrive at the station synchronously, which is easy to implement and has high availability.

In step 101-2, in response to the data frames in the plurality of frequency bands do not need to arrive at the station synchronously, the values of the first target domains are set, in the RTS frames corresponding to each frequency band, to be second target values that are different from each other.

When multi-band asynchronous communication is required, the access point may set, in the RTS frames corresponding to each frequency band, the values of the first target domains to be the second target values that are different from each other, so that the data frames corresponding to the plurality of frequency bands may arrive at the station asynchronously.

In the above example, during the multi-band asynchronous communication, the access point may set the values of the first target domains in the RTS frames corresponding to each frequency band to be the second target values that are different from each other, making the multi-band asynchronous communication more flexible.

In an example, referring to FIG. 4, FIG. 4 is a flowchart of yet another multi-band communication method according to an example. The process for determining the first target values includes:

In step 201, for each frequency band, ratios of the quantity of data to be transmitted to a transmission rate indicated by a modulation and coding scheme are calculated respectively.

In the example of the disclosure, the modulation and coding scheme (MCS) in each frequency band may indicate the transmission rate corresponding to the frequency band.

For each frequency band, the access point may calculate the ratios of the quantity of the data to be transmitted to the transmission rate.

In step 202, a maximum value among the ratios is used as the first target value.

In this step, the access point may use the maximum value among the ratios calculated for different frequency bands as the first target value.

For example, a duration value of the quantity of data to be transmitted in a frequency band 1 is $s_1$, a transmission rate indicated by the MCS is $v_1$, a duration value of the quantity of data to be transmitted in a frequency band 2 is $s_2$, a transmission rate indicated by the MCS is $v_2$, a duration value of the quantity of data to be transmitted in a frequency band 3 is $s_3$, and a transmission rate indicated by the MCS is $v_3$. $s_1/v_1$, $s_2/v_2$, and $s_3/v_3$ are calculated respectively, and a maximum value among the three calculated ratios is used as the first target value.

In an example, in response to the quantity of data frames to be sent in a current frequency band being 1, a ratio corresponding to the current frequency band may be a sum of a duration value of the RTS frame, a duration value of a CTS frame, a duration value of pending transmission (that is, data frame), a duration value of ACK (that is, feedback information), and a duration value of three short interframe spaces (SIFSs).

In response to the quantity of the data frames to be sent in the current frequency band being n, and n is a positive integer greater than 1, a ratio corresponding to the current frequency band may be a sum of the duration value of the RTS frame, the duration value of the CTS frame, the duration value of pending transmission, the duration value of ACK, the duration value of the 3×SIFS, and a duration value of n×SIFS.

During the multi-band synchronous communication, the access point uses the maximum value among the ratios calculated in the above manner for each frequency band as the values of the first target domains, namely, the first target value.

In the above example, in response to the data frames in the plurality of frequency bands needing to arrive at the station synchronously, the access point may calculate the ratios corresponding to each frequency band respectively, use the maximum value among the ratios as the first target value, and set the values of the first target domains in the RTS frames corresponding to each frequency band to be the first target values that are same with each other, ensuring that the RTS frames corresponding to each frequency band may arrive at the station synchronously.

Figure 5:
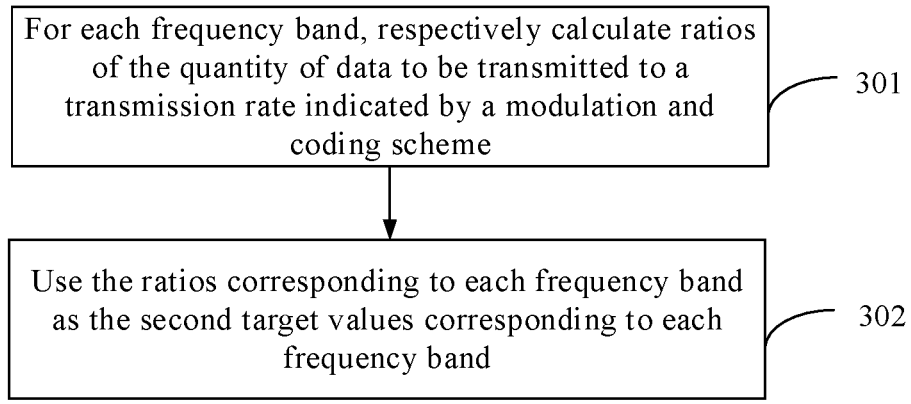
FIG. 5 is a schematic flowchart of yet another multi-band communication method according to an example.

In an example, referring to FIG. 5, FIG. 5 is a flowchart of yet another multi-band communication method according to an example. The process for determining the second target values includes:

In step 301, for each frequency band, ratios of the quantity of the data to be transmitted to the transmission rate indicated by the modulation and coding scheme are calculated.

In the example of the disclosure, the MCS for each frequency band may indicate the transmission rate corresponding to the frequency band. For each frequency band, the access point may calculate the ratios of the quantity of the data to be transmitted to the transmission rate.

In step 302, the ratios corresponding to each frequency band are used as the second target values corresponding to each frequency band.

For example, a ratio corresponding to frequency band 1 is $a_1$, a ratio corresponding to frequency band 2 is $a_2$, and a ratio corresponding to frequency band 3 is $a_3$, so the value of the first target domain in the RTS frame corresponding to frequency band 1 is $a_1$, the value of the first target domain in the RTS frame corresponding to frequency band 2 is $a_2$, and the value of the first target domain in the RTS frame corresponding to frequency band 3 is $a_3$.

In the above example, in response to the data frames corresponding to each frequency band do not need to arrive at the station synchronously, the access point may respectively calculate, for each frequency band, the ratios of the quantity of the data to be transmitted to the transmission rate indicated by the modulation and coding scheme, and use the ratios corresponding to each frequency band as the second target values corresponding to each frequency band, which has high availability.

In an example, in response to the quantity of the data frames to be sent in the current frequency band being 1, the ratio corresponding to the current frequency band may be the sum of the duration value of the RTS frame, the duration value of the CTS frame, the duration value of pending transmission (that is, data frame), the duration value of ACK (that is, feedback information), and the duration value of the three short interframe spaces (SIFSs).

In response to the quantity of the data frames to be sent in the current frequency band being n, and n is a positive integer greater than 1, the ratio corresponding to the current frequency band may be the sum of the duration value of the RTS frame, the duration value of the CTS frame, the duration value of pending transmission, the duration value of ACK, the duration value of the 3×SIFS, and the duration value of the n×SIFS.

During the multi-band asynchronous communication, the access point uses the ratios calculated in the above manner for each frequency band as the different values of the first target domains, namely, the second target values.

Figure 6:
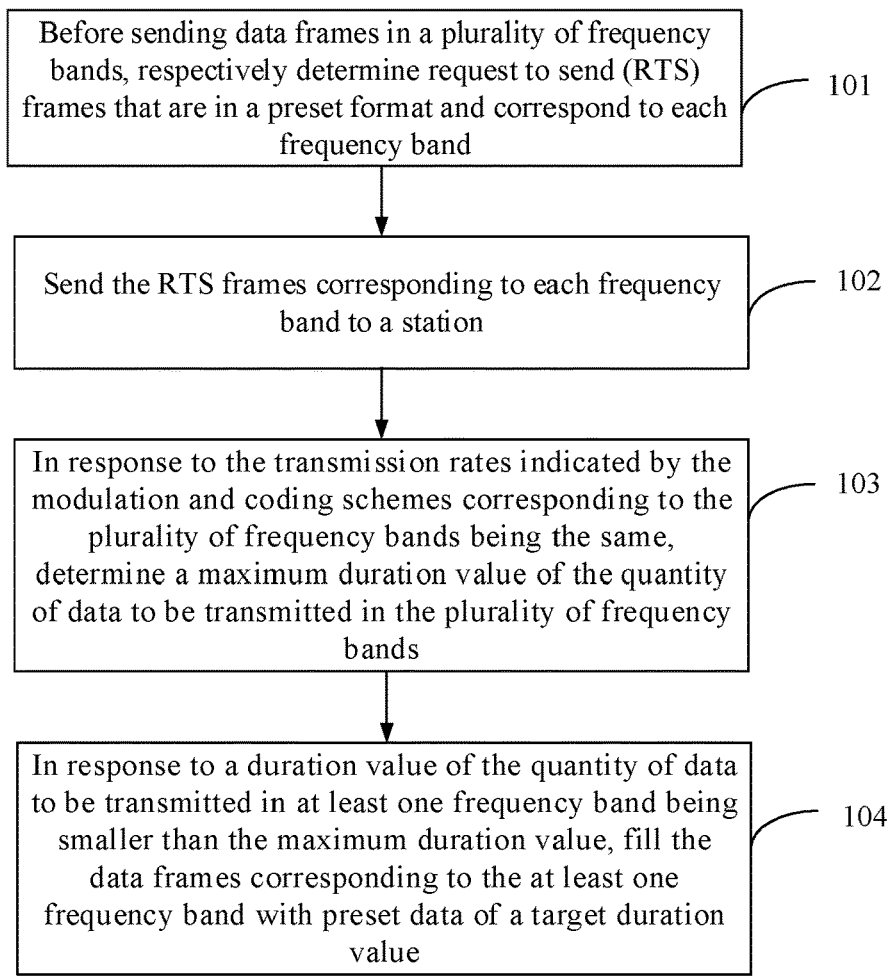
FIG. 6 is a schematic flowchart of yet another multi-band communication method according to an example.

In an example, for the multi-band synchronous communication, referring to FIG. 6, FIG. 6 is a flowchart of yet another multi-band communication method according to the example shown in FIG. 1. The method may further include:

In step 103, in response to the transmission rates indicated by the modulation and coding schemes corresponding to the plurality of frequency bands being the same, a maximum duration value of the quantity of the data to be transmitted in the plurality of frequency bands is determined.

For example, the duration value of the quantity of the data to be transmitted in frequency band 1 is $s_1$, the duration value of the quantity of the data to be transmitted in frequency band 2 is $s_2$, the duration value of the quantity of the data to be transmitted in frequency band 3 is $s_3$, transmission rates indicated by the MCS for the three frequency bands are all v, and then a maximum value among $s_1$, $s_2$ and $s_3$ may be determined.

In step 104, if a duration value of the quantity of data to be transmitted in at least one frequency band is smaller than the maximum duration value, a data frame corresponding to the at least one frequency band is filled with preset data of a target duration value.

In the example of the disclosure, the preset data may all be 0 or 1, or may be at least one bit value pre-defined in the protocol by the station and the access point.

In this step, the target duration value may be a difference between the maximum duration value and the duration value of the quantity of the data to be transmitted in the at least one frequency band.

For example, the duration value of the quantity of the data to be transmitted in frequency band 1 is $s_1$, the duration value of the quantity of the data to be transmitted in frequency band 2 is $s_2$, the duration value of the quantity of the data to be transmitted in frequency band 3 is $s_3$, the transmission rates indicated by the MCS for the three frequency bands are all v, and the maximum value among $s_1$, $s_2$ and $s_3$ is $s_1$. When a data frame corresponding to frequency band 2 is sent, the data frame in frequency band 2 may be filled with preset data with a target duration value being ($s_1$-$s_2$). When a data frame corresponding to frequency band 3 is sent, the data frame in frequency band 3 may be filled with preset data with a target duration value being ($s_1$-$s_3$).

In the above example, during the multi-band synchronous communication, it may also be ensured that the data frames corresponding to the plurality of frequency bands may arrive at the station synchronously.

Figure 7:
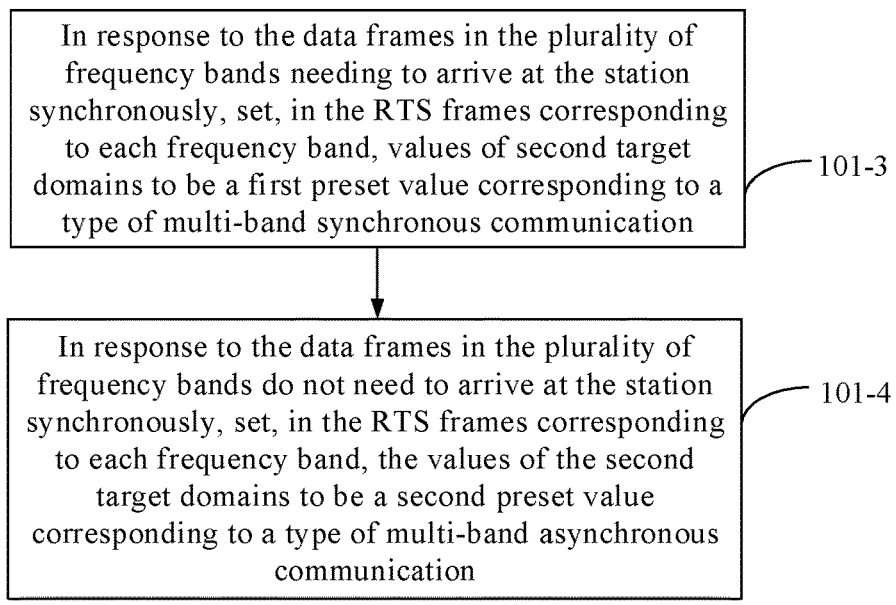
FIG. 7 is a schematic flowchart of yet another multi-band communication method according to an example.

In an example, referring to FIG. 7, FIG. 7 is a flowchart of yet another multi-band communication method according to the example shown in FIG. 1. Step 101 may include:

In step 101-3, in response to the data frames in the plurality of frequency bands needing to arrive at the station synchronously, values of second target domains are set, in the RTS frames corresponding to each frequency band, to be a first preset value corresponding to a type of the multi-band synchronous communication.

During the multi-band synchronous communication, the access point may set the values of the second target domains in the RTS frames corresponding to each frequency band to be the first preset value corresponding to the type of the multi-band synchronous communication. The second target domain is a domain configured to represent a type and subtype of the RTS frame, for example, a frame control domain.

For example, as shown in FIG. 8A, during the multi-band synchronous communication, the access point sets values of second target domains corresponding to three frequency bands to be the first preset value corresponding to the type of the multi-band synchronous communication.

In step 101-4, in response to the data frames in the plurality of frequency bands do not need to arrive at the station synchronously, the values of the second target domains are set, in the RTS frames corresponding to each frequency band, to be a second preset value corresponding to a type of the multi-band asynchronous communication.

During the multi-band asynchronous communication, the access point may set the values of the second target domains in the RTS frames corresponding to each frequency band to be the second preset value corresponding to the type of the multi-band asynchronous communication.

As shown in FIG. 8B, during the multi-band asynchronous communication, the access point sets the values of the second target domains to be the second preset value corresponding to the type of the multi-band asynchronous communication.

The above first preset value and second preset value may be pre-defined in the protocol, and the station may determine whether it is currently the multi-band synchronous communication or the multi-band asynchronous communication according to the values of the second target domains.

In the above example, the station may determine whether it currently belongs to the multi-band synchronous communication or the multi-band asynchronous communication according to the values of the second target domains. The purpose of preventing, during the multi-band communication, the hidden nodes from interfering with the communication requirement by means of the RTS mechanism is also achieved, and the throughput of the system is improved.

In an example, referring to FIG. 9, FIG. 9 is a flowchart of yet another multi-band communication method according to the example shown in FIG. 1. Step 102 may include:

In step 102-1, in response to the data frames in the plurality of frequency bands needing to arrive at the station synchronously, the RTS frames corresponding to each frequency band are sent to the station synchronously.

If the multi-band synchronous communication is required, the access point needs to send the RTS frames corresponding to each frequency band to the station synchronously.

In step 102-2, in response to the data RTS frames in the plurality of frequency bands do not need to arrive at the station synchronously, the RTS frames corresponding to each frequency band are sent to the station asynchronously.

If the multi-band asynchronous communication is required, the access point may send the RTS frames corresponding to each frequency band to the station asynchronously.

In the above example, in response to the data frames in the plurality of frequency bands needing to arrive at the station synchronously, the access point may send the RTS frames corresponding to each frequency band to the station synchronously. In response to the data frames in the plurality of frequency bands do not need to arrive at the station synchronously, the access point may send the RTS frames corresponding to each frequency band to the station asynchronously. The purpose of preventing, during the multi-band communication, the hidden nodes from interfering with the communication requirement by means of the RTS mechanism is achieved, and the throughput of the system is improved.

The multi-band communication method provided by the example of the disclosure will be described below from a station side.

An example of the disclosure provides a multi-band communication method applicable to a station (STA), such as a base station. Referring to FIG. 10, FIG. 10 is a flowchart of yet another multi-band communication method according to an example. The method may include the following steps:

In step 401, before data frames in a plurality of frequency bands are sent, request to send (RTS) frames that are in a preset format and correspond to each frequency band are determined respectively.

In the example of the disclosure, an access point and the station may pre-define in a protocol, the preset format of the RTS frames sent during multi-band communication. Before sending the data frames in the plurality of frequency bands, the station firstly sends the RTS frames corresponding to each frequency band, and at this time, the station may determine the RTS frames corresponding to each frequency band by using the preset format in the protocol.

In step 402, the RTS frames corresponding to each frequency band are sent to the access point.

After the access point receives the RTS frames, if the RTS frames meet the preset format in the protocol, the access point may determine that the access point is currently in multi-band communication with the station.

In the above example, the purpose of preventing, during the multi-band communication, hidden nodes from interfering with a communication requirement by means of an RTS mechanism is achieved, and the throughput of a system is improved.

In an example, the station is used as a transmitter. The station firstly determines the RTS frames that are in the preset format and correspond to each frequency band, before sending the data frames in the plurality of frequency bands. Similarly, because BSSs formed when the AP is working in different frequency bands are different, the station may set, in the RTS frames corresponding to each frequency band, receiver addresses that are different from each other and transmitter addresses that are same with each other. The transmitter addresses are all an address of the station.

For example, when the station is used as the transmitter, as shown in FIG. 11, no matter whether the station and the access point are in multi-band synchronous communication or multi-band asynchronous communication, the station sets receiver addresses that are different from each other in RTS frames corresponding to three frequency bands, namely A1, A2 and A3, and sets transmitter addresses B that are same with each other in the RTS frames corresponding to the three frequency bands.

In an example, the station may randomly generate the receiver addresses that are different from each other in the RTS frames corresponding to each frequency band.

In an example, referring to FIG. 12, FIG. 12 is a flowchart of yet another multi-band communication method according to the example shown in FIG. 10. Step 401 may include:

In step 401-1, in response to the data frames in the plurality of frequency bands needing to arrive at the access point synchronously, values of a first target domains are set, in the RTS frames corresponding to each frequency band, to be first target values that are same with each other.

When multi-frequency synchronous communication is required, the station needs to set, in the RTS frames corresponding to each frequency band, the values of the first target domains to be the first target values that are same with each other The first target domain is a domain configured to represent a duration value of the RTS frame, for example, it may be a duration domain. In this way, the data frames corresponding to the plurality of frequency bands sent synchronously can arrive at the access point synchronously.

In the above example, when the data frames in the plurality of frequency bands need to arrive at the access point synchronously, the station sets the values of the first target domains to be the first target values that are same with each other, so as to ensure that the data frames corresponding to the plurality of frequency bands may arrive at the access point synchronously, which is easy to implement and has high availability.

In step 401-2, in response to the data frames in the plurality of frequency bands do not need to arrive at the access point synchronously, the values of the first target domains are set, in the RTS frames corresponding to each frequency band, to be second target values that are different from each other.

When multi-band asynchronous communication is required, the station may set, in the RTS frames corresponding to each frequency band, the values of the first target domains to be the second target values that are different from each other, so that the data frames corresponding to the plurality of frequency bands may arrive at the access points asynchronously.

In the above example, during the multi-band asynchronous communication, the station may set the values of the first target domains in the RTS frames corresponding to each frequency band to be the second target values that are different from each other, making the multi-band asynchronous communication more flexible.

Figure 13:
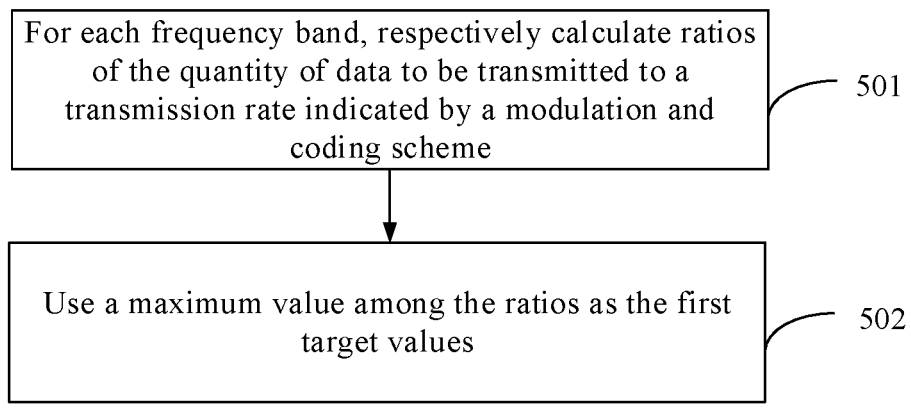
FIG. 13 is a schematic flowchart of yet another multi-band communication method according to an example.

In an example, referring to FIG. 13, FIG. 13 is a flowchart of yet another multi-band communication method according to an example. The process for determining the first target value includes:

In step 501, for each frequency band, ratios of the quantity of data to be transmitted to a transmission rate indicated by a modulation and coding scheme are calculated respectively.

In the example of the disclosure, the modulation and coding scheme (MCS) for each frequency band may indicate the transmission rate corresponding to the frequency band. For each frequency band, the station may calculate the ratios of the quantity of the data to be transmitted to the transmission rate.

In step 502, a maximum value among the ratios is used as the first target values.

In this step, the station may use the maximum value among the ratios calculated for different frequency bands as the first target value.

For example, a duration value of the quantity of data to be transmitted in frequency band 1 is $s_1$, a transmission rate indicated by the MCS is $v_1$, a duration value of the quantity of data to be transmitted in frequency band 2 is $s_2$, a transmission rate indicated by the MCS is $v_2$, a duration value of the quantity of data to be transmitted in frequency band 3 is $s_3$, and a transmission rate indicated by the MCS is $v_3$. $s_1/v_1$, $s_2/v_2$, and $s_3/v_3$ are calculated respectively, and a maximum value among the three calculated ratios is used as the first target value.

In an example, in response to the quantity of data frames to be sent in a current frequency band being 1, a ratio corresponding to the current frequency band may be a sum of a duration value of the RTS frame, a duration value of a CTS frame, a duration value of pending transmission (that is, data frame), a duration value of ACK (that is, feedback information), and a duration value of three short interframe spaces (SIFSs).

In response to the quantity of the data frames to be sent in the current frequency band being n, and n is a positive integer greater than 1, the ratio corresponding to the current frequency band may be a sum of the duration value of the RTS frame, the duration value of the CTS frame, the duration value of pending transmission, the duration value of ACK, the duration value of the 3×SIFS, and a duration value of n×SIFS.

During the multi-band synchronous communication, the station uses the maximum value among the ratios calculated in the above manner for each frequency band as the values of the first target domains, namely, the first target value.

In the above example, in response to the data frames in the plurality of frequency bands needing to arrive at the access point synchronously, the station may calculate the ratios corresponding to each frequency band, use the maximum value among the ratios as the first target value, and set the values of the first target domains in the RTS frames corresponding to each frequency band to be the first target values that are same with each other, ensuring that the RTS frames corresponding to each frequency band may arrive at the access point synchronously.

Figure 14:
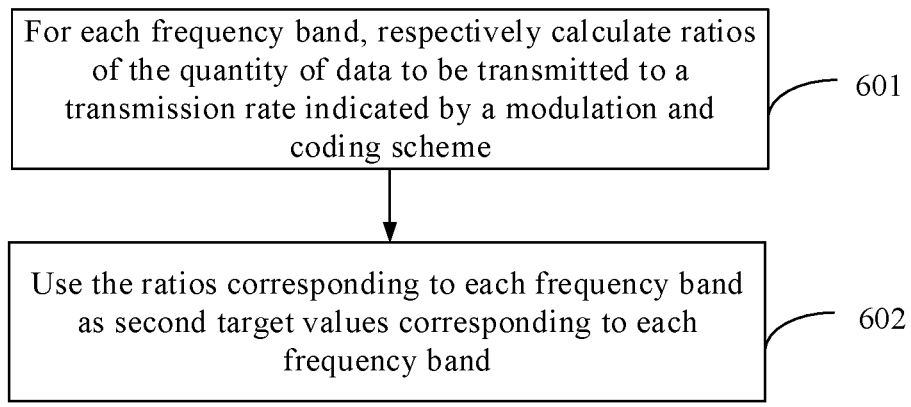
FIG. 14 is a schematic flowchart of yet another multi-band communication method according to an example.

In an example, referring to FIG. 14, FIG. 14 is a flowchart of yet another multi-band communication method according to an example. The process for determining the second target values includes:

In step 601, for each frequency band, ratios of the quantity of the data to be transmitted to a transmission rate indicated by a modulation and coding scheme are calculated respectively.

In the example of the disclosure, the MCS for each frequency band may indicate the transmission rate corresponding to the frequency band. For each frequency band, the station may calculate the ratios of the quantity of the data to be transmitted to the transmission rate.

In step 602, the ratios corresponding to each frequency band are used as the second target values corresponding to each frequency band.

For example, a ratio corresponding to frequency band 1 is $a_1$, a ratio corresponding to frequency band 2 is $a_2$, and a ratio corresponding to frequency band 3 is $a_3$, so the value of the first target domain in the RTS frame corresponding to frequency band 1 is $a_1$, the value of the first target domain in the RTS frame corresponding to frequency band 2 is $a_2$, and the value of the first target domain in the RTS frame corresponding to frequency band 3 is $a_3$.

In the above example, in response to the RTS frames corresponding to each frequency band do not need to arrive at the access point synchronously, the station may respectively calculate, for each frequency band, the ratios of the quantity of the data to be transmitted to the transmission rate indicated by the modulation and coding scheme, and use the ratios corresponding to each frequency band as the second target values corresponding to each frequency band, and the availability is high.

In an example, in response to the quantity of the data frames to be sent in the current frequency band being 1, the ratio corresponding to the current frequency band may be the sum of the duration value of the RTS frame, the duration value of the CTS frame, the duration value of pending transmission (that is, data frame), the duration value of ACK (that is, feedback information), and the duration value of the three short interframe spaces (SIFSs).

In response to the quantity of the data frames to be sent in the current frequency band being n, and n is a positive integer greater than 1, the ratio corresponding to the current frequency band may be the sum of the duration value of the RTS frame, the duration value of the CTS frame, the duration value of pending transmission, the duration value of ACK, the duration value of the 3×SIFS, and the duration value of the n×SIFS.

During the multi-band asynchronous communication, the station respectively uses the ratios calculated in the above manner for each frequency band as the different values of the first target domains, namely, the second target values.

Figure 15:
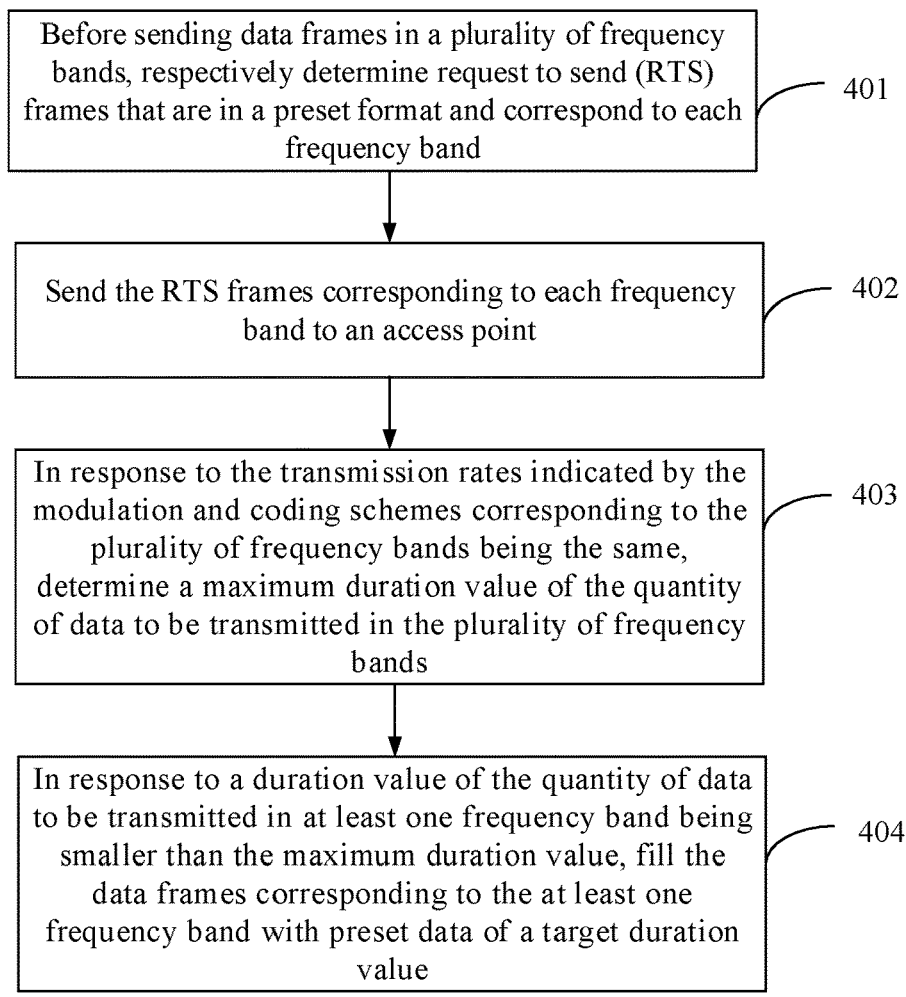
FIG. 15 is a schematic flowchart of yet another multi-band communication method according to an example.

In an example, for the multi-band synchronous communication, referring to FIG. 15, FIG. 15 is a flowchart of yet another multi-band communication method according to the example shown in FIG. 10. The method may further include:

In step 403, in response to the transmission rates indicated by the modulation and coding schemes corresponding to the plurality of frequency bands being the same, a maximum duration value of the quantity of the data to be transmitted in the plurality of frequency bands is determined.

For example, the duration value of the quantity of the data to be transmitted in frequency band 1 is $s_1$, the duration value of the quantity of the data to be transmitted in frequency band 2 is $s_2$, the duration value of the quantity of the data to be transmitted in frequency band 3 is $s_3$, transmission rates indicated by the MCS in the three frequency bands are all v, and then a maximum value among $s_1$, $s_2$ and $s_3$ may be determined.

In step 404, if a duration value of the quantity of data to be transmitted in at least one frequency band is smaller than the maximum duration value, a data frame corresponding to the at least one frequency band is filled with preset data of a target duration value.

In the example of the disclosure, the preset data may all be 0 or 1, or may be at least one bit value pre-defined in the protocol by the station and the access point.

In this step, the target duration value may be a difference between the maximum duration value and the duration value of the quantity of the data to be transmitted in the at least one frequency band.

For example, the duration value of the quantity of the data to be transmitted in frequency band 1 is $s_1$, the duration value of the quantity of the data to be transmitted in frequency band 2 is $s_2$, the duration value of the quantity of the data to be transmitted in frequency band 3 is $s_3$, the transmission rates indicated by the MCS in the three frequency bands are all v, and the maximum value among $s_1$, $s_2$ and $s_3$ is $s_1$. When a data frame corresponding to frequency band 2 is sent, the data frame corresponding to frequency band 2 may be filled with preset data with a target duration value being $(s_1-s_2)$. When a data frame corresponding to frequency band 3 is sent, the data frame corresponding to frequency band 3 may be filled with preset data with a target duration value being $(s_1-s_3)$.

In the above example, during the multi-frequency synchronous communication, it may also be ensured that the data frames corresponding to the plurality of frequency bands may arrive at the access point synchronously.

Figure 16:
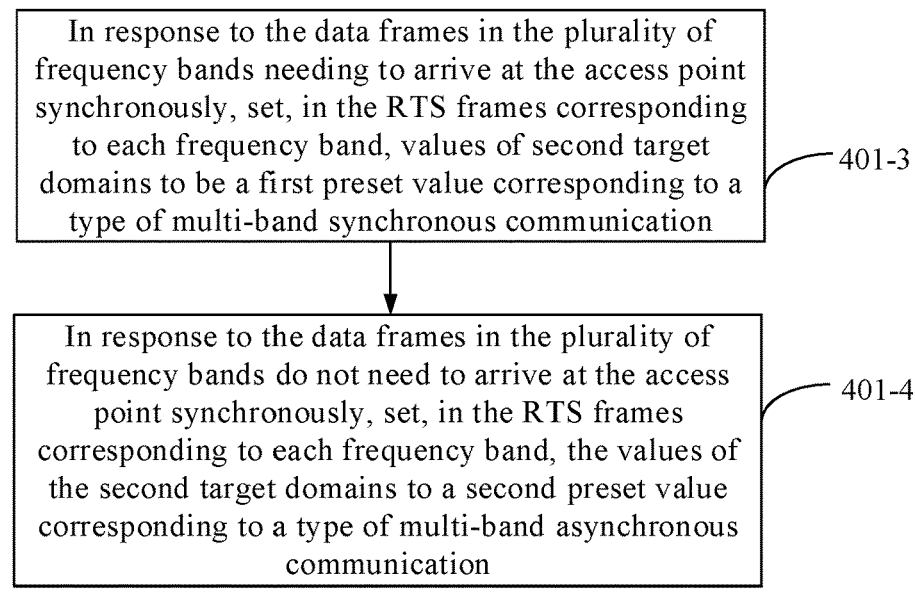
FIG. 16 is a schematic flowchart of yet another multi-band communication method according to an example.

In an example, referring to FIG. 16, FIG. 16 is a flowchart of yet another multi-band communication method according to the example shown in FIG. 10. Step 401 may include:

In step 401-3, in response to the data frames in the plurality of frequency bands needing to arrive at the access point synchronously, values of second target domains are set, in the RTS frames corresponding to each frequency band, to be a first preset value corresponding to a type of the multi-band synchronous communication.

During the multi-band synchronous communication, the station may set the values of the second target domains in the RTS frames corresponding to each frequency band to be the first preset value corresponding to the type of the multi-band synchronous communication. The second target domain is a domain configured to represent a type and subtype of the RTS frame, for example, a frame control domain.

In step 401-4, in response to the data frames in the plurality of frequency bands do not need to arrive at the access point synchronously, the values of the second target domains are set, in the RTS frames corresponding to each frequency band, to be a second preset value corresponding to a type of the multi-band asynchronous communication.

During the multi-band asynchronous communication, the station may set the values of the second target domains in the RTS frames corresponding to each frequency band to be the second preset value corresponding to the type of the multi-band asynchronous communication.

The above first preset value and second preset value may be pre-defined in the protocol, and the access point may determine whether it is currently the multi-band synchronous communication or the multi-band asynchronous communication according to the values of the second target domains.

In the above example, the access point may determine whether it currently belongs to the multi-band synchronous communication or the multi-band asynchronous communication according to the values of the second target domains. The purpose of preventing, during the multi-band communication, the hidden nodes from interfering with the communication requirement by means of the RTS mechanism is also achieved, and the throughput of the system is improved.

In an example, referring to FIG. 17, FIG. 17 is a flowchart of yet another multi-band communication method according to the example shown in FIG. 10. Step 402 may include:

In step 402-1, in response to the data frames in the plurality of frequency bands needing to arrive at the access point synchronously, the RTS frames corresponding to each frequency band are sent to the access point synchronously.

If the multi-band synchronous communication is required, the station needs to send the RTS frames corresponding to each frequency band to the access point synchronously.

In step 402-2, in response to the data RTS frames in the plurality of frequency bands do not need to arrive at the access point synchronously, the RTS frames corresponding to each frequency band are sent to the access point asynchronously.

If the multi-band asynchronous communication is required, the station may send the RTS frames corresponding to each frequency band to the access point asynchronously.

In the above example, the purpose of preventing, during the multi-band communication, the hidden nodes from interfering with the communication requirement by means of the RTS mechanism is achieved, and the throughput of the system is improved.

Next, the multi-band synchronous communication and the multi-band asynchronous communication will be introduced from the access point side and the station side respectively.

When the access point is used as the transmitter for the multi-frequency synchronous communication, the RTS frames sent by the access point in the plurality of frequency bands may be as shown in FIG. 18A.

Values of the type and subtype of the frames in the second target domains are the first preset value that is pre-defined in the protocol and corresponds to the type of the multi-band synchronous communication. The values of the first target domains are the first target values that are same with each other, and may specifically be the maximum value among the ratios of the quantity of the data to be transmitted to the transmission rate indicated by the modulation and coding scheme for each frequency band. The receiver addresses for the RTS frames corresponding to each frequency band are the same, for example, all being A. The transmitter addresses for the RTS frames corresponding to each frequency band are different, and may be randomly generated by the access point, for example, being B1, B2, and B3 respectively. Values corresponding to frame check sequence (FCS) frames may be the same or different, which is not limited in the disclosure.

In response to the transmission rates indicated by the modulation and coding schemes corresponding to the plurality of frequency bands are the same and the duration value of the quantity of data to be transmitted in at least one frequency band is smaller than the maximum duration value, the data frame corresponding to the at least one frequency band needs to be filled with the preset data of the target duration value. The target duration value is the difference between the maximum duration value of the quantity of the data to be transmitted in the plurality of frequency bands and the duration value of the quantity of the data to be transmitted in the at least one frequency band.

When the access point is used as the transmitter for the multi-band asynchronous communication, the RTS frames sent by the access point in the plurality of frequency bands may be as shown in FIG. 18B.

The values of the type and subtype of the frames in the second target domains are the second preset value that is pre-defined in the protocol and corresponds to the type of the multi-band asynchronous communication. The values of the first target domains in the RTS frames corresponding to each frequency band are the second target values that are different from each other, and may specifically be the ratios of the quantity of the data to be transmitted to the transmission rate indicated by the modulation and coding scheme for each frequency band, for example, being b1, b2 and b3 respectively. The receiver addresses for the RTS frames corresponding to each frequency band are the same, for example, all being A. The transmitter addresses for the RTS frames corresponding to each frequency band are different, and may be randomly generated by the access point, for example, being B1, B2, and B3 respectively. The values corresponding to the frame check sequence (FCS) frames may be the same or different, which is not limited in the disclosure.

When the station is used as the transmitter for the multi-band synchronous communication, the RTS frames sent by the station in the plurality of frequency bands may be as shown in FIG. 19A.

Values of the type and subtype of the frames in the second target domains are the first preset value that is pre-defined in the protocol and corresponds to the type of the multi-band synchronous communication. The values of the first target domains are the first target values that are same with each other, and may specifically be the maximum value among the ratios of the quantity of the data to be transmitted to the transmission rate indicated by the modulation and coding scheme for each frequency band. The receiver addresses for the RTS frames corresponding to each frequency band are different, and may be randomly generated by the station, for example, being A1, A2, and A3 respectively. The transmitter addresses for the RTS frames corresponding to each frequency band are the same, for example, all being B. Values corresponding to frame check sequence (FCS) frames may be the same or different, which is not limited in the disclosure.

Similarly, in response to the transmission rates indicated by the modulation and coding schemes corresponding to the plurality of frequency bands are the same and the duration value of the quantity of data to be transmitted in at least one frequency band is smaller than the maximum duration value, the data frame corresponding to the at least one frequency band needs to be filled with the preset data of the target duration value. The target duration value is the difference between the maximum duration value of the quantity of the data to be transmitted in the plurality of frequency bands and the duration value of the quantity of the data to be transmitted in the at least one frequency band.

When the station is used as the transmitter for the multi-band asynchronous communication, the RTS frames sent by the station in the plurality of frequency bands may be as shown in FIG. 19B.

The values of the type and subtype of the frames in the second target domains are the second preset value that is pre-defined in the protocol and corresponds to the type of the multi-band asynchronous communication. The values of the first target domains in the RTS frames corresponding to each frequency band are the second target values that are different from each other, and may specifically be the ratios of the quantity of the data to be transmitted to the transmission rate indicated by the modulation and coding scheme for each frequency band, for example, being b1, b2 and b3 respectively. The receiver addresses for the RTS frames corresponding to each frequency band are different, and may be randomly generated by the station, for example, being A1, A2, and A3 respectively. The transmitter addresses for the RTS frames corresponding to each frequency band are the same, for example, all being B. The values corresponding to the frame check sequence (FCS) frames may be the same or different, which is not limited in the disclosure.

In the example, the purpose of preventing, during the multi-band synchronous communication or the multi-band asynchronous communication, the hidden nodes from interfering with the communication requirement by means of the RTS mechanism is achieved, and the throughput of the system is improved.

Corresponding to the above example of the method for implementing application functions, the disclosure further provides examples of an apparatus for implementing the application functions, and corresponding access point and station.

Referring to FIG. 20, FIG. 20 is a block diagram of a multi-band communication apparatus according to an example. The apparatus is applied to an access point, and includes:

a first determining module 710, configured to respectively determine, before sending data frames in a plurality of frequency bands, request to send (RTS) frames that are in a preset format and correspond to each frequency band; and a first sending module 720, configured to send the RTS frames corresponding to each frequency band to a station.

Figure 21:
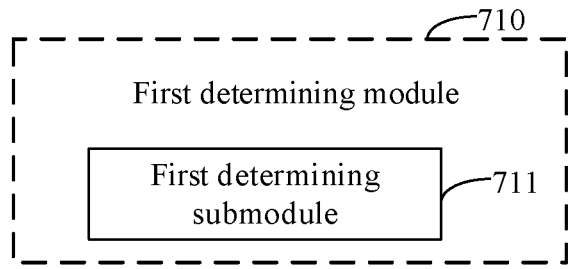
FIG. 21 is a block diagram of another multi-band communication apparatus according to an example.

Referring to FIG. 21, FIG. 21 is a block diagram of another multi-band communication apparatus based on the example shown in FIG. 20. The first determining module 710 includes:

a first determining submodule 711, configured to set transmitter addresses that are different from each other and receiver addresses that are same with each other in the RTS frames that are in the preset format and correspond to each frequency band.

Figure 22:
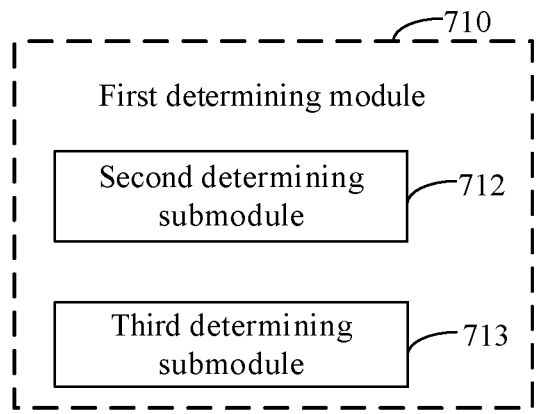
FIG. 22 is a block diagram of yet another multi-band communication apparatus according to an example.

Referring to FIG. 22, FIG. 22 is a block diagram of yet another multi-band communication apparatus based on the example shown in FIG. 20. The first determining module 710 includes:

a second determining submodule 712, configured to set, in the RTS frames corresponding to each frequency band, values of first target domains to be first target values that are same with each other in response to the data frames in the plurality of frequency bands needing to arrive at the station synchronously; and a third determining submodule 713, configured to set, in the RTS frames corresponding to each frequency band, the values of the first target domains to be second target values that are different from each other in response to the data frames in the plurality of frequency bands do not need to arrive at the station synchronously.

The first target domain is a domain configured to represent a duration value of the RTS frame.

Figure 23:
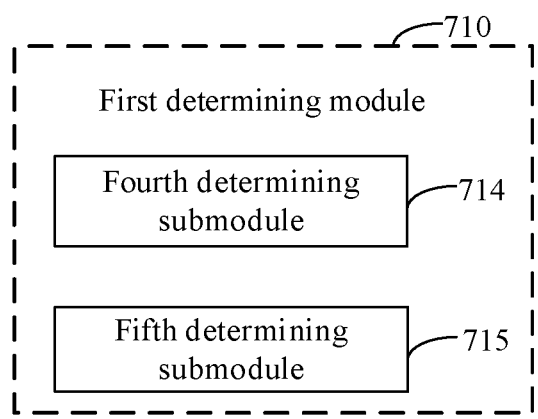
FIG. 23 is a block diagram of yet another multi-band communication apparatus according to an example.

Referring to FIG. 23, FIG. 23 is a block diagram of yet another multi-band communication apparatus based on the example shown in FIG. 20. The first determining module 710 includes:

a fourth determining submodule 714, configured to set, in the RTS frames corresponding to each frequency band, values of second target domains to be a first preset value corresponding to a type of multi-band synchronous communication in response to the data frames in the plurality of frequency bands needing to arrive at the station synchronously; and a fifth determining submodule 715, configured to set, in the RTS frames corresponding to each frequency band, the values of the second target domains to be a second preset value corresponding to a type of multi-band asynchronous communication in response to the data frames in the plurality of frequency bands do not need to arrive at the station synchronously.

The second target domain is a domain configured to represent a type and subtype of the RTS frame.

Figure 24:
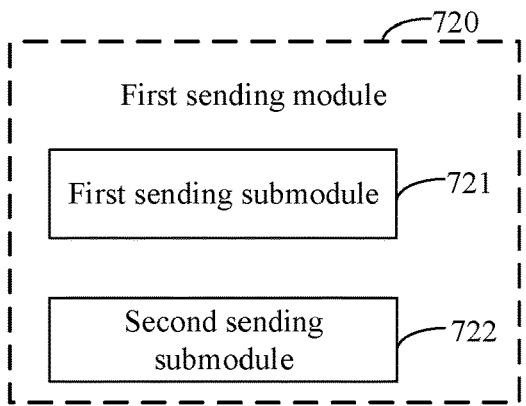
FIG. 24 is a block diagram of yet another multi-band communication apparatus according to an example.

Referring to FIG. 24, FIG. 24 is a block diagram of yet another multi-band communication apparatus based on the example shown in FIG. 20. The first sending module 720 includes:

a first sending submodule 721, configured to send the RTS frames corresponding to each frequency band to the station synchronously in response to the data frames in the plurality of frequency bands needing to arrive at the station synchronously; and a second sending submodule 722, configured to send the RTS frames corresponding to each frequency band to the station asynchronously in response to the data frames in the plurality of frequency bands do not need to arrive at the station synchronously.

Figure 25:
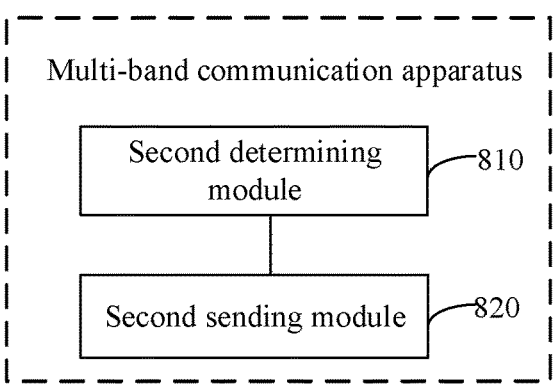
FIG. 25 is a block diagram of yet another multi-band communication apparatus according to an example.

Referring to FIG. 25, FIG. 25 is a block diagram of yet another multi-band communication apparatus according to an example. The apparatus is applied to a station, and includes:

a second determining module 810, configured to respectively determine, before sending data frames in a plurality of frequency bands, request to send (RTS) frames that are in a preset format and correspond to each frequency band; and a second sending module 820, configured to send the RTS frames corresponding to each frequency band to an access point.

Figure 26:
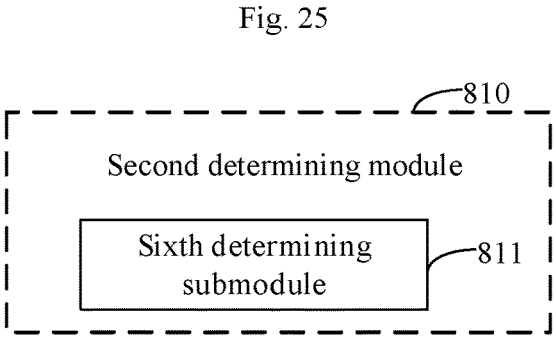
FIG. 26 is a block diagram of yet another multi-band communication apparatus according to an example.

Referring to FIG. 26, FIG. 26 is a block diagram of yet another multi-band communication apparatus based on the example shown in FIG. 25. The second determining module 810 includes:

a sixth determining submodule 811, configured to set transmitter addresses that are same with each other and receiver addresses that are different from each other in the RTS frames that are in the preset format and correspond to each frequency band.

Figure 27:
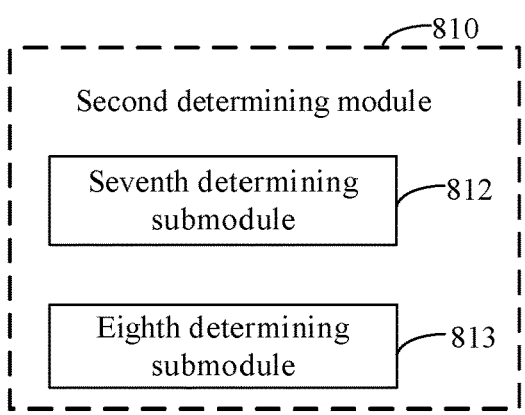
FIG. 27 is a block diagram of yet another multi-band communication apparatus according to an example.

Referring to FIG. 27, FIG. 27 is a block diagram of yet another multi-band communication apparatus based on the example shown in FIG. 25. The second determining module 810 includes:

a seventh determining submodule 812, configured to set, in the RTS frames corresponding to each frequency band, values of first target domains to be first target values that are same with each other in response to the data frames in the plurality of frequency bands needing to arrive at the access point synchronously; and an eighth determining submodule 813, configured to set, in the RTS frames corresponding to each frequency band, the values of the first target domains to be second target values that are different from each other in response to the data frames in the plurality of frequency bands do not need to arrive at the access point synchronously.

The first target domain is a domain configured to represent a duration value of the RTS frame.

Figure 28:
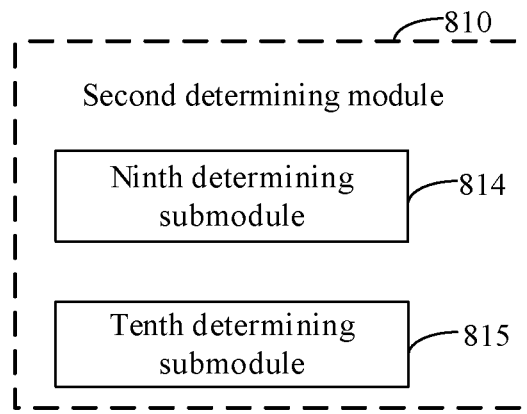
FIG. 28 is a block diagram of yet another multi-band communication apparatus according to an example.

Referring to FIG. 28, FIG. 28 is a block diagram of yet another multi-band communication apparatus based on the example shown in FIG. 25. The second determining module 810 includes:

a ninth determining submodule 814, configured to set, in the RTS frames corresponding to each frequency band, values of second target domains to be a first preset value corresponding to a type of multi-band synchronous communication in response to the data frames in the plurality of frequency bands needing to arrive at the access point synchronously; and a tenth determining submodule 815, configured to set, in the RTS frames corresponding to each frequency band, the values of the second target domains to be a second preset value corresponding to a type of multi-band asynchronous communication in response to the data frames in the plurality of frequency bands do not need to arrive at the access point synchronously.

The second target domain is a domain configured to represent a type and subtype of the RTS frame.

Figure 29:
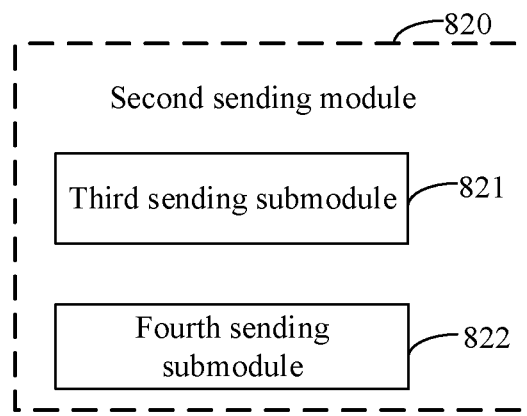
FIG. 29 is a block diagram of yet another multi-band communication apparatus according to an example.

Referring to FIG. 29, FIG. 29 is a block diagram of yet another multi-band communication apparatus based on the example shown in FIG. 25. The second sending module 820 includes:

a third sending submodule 821, configured to send the RTS frames corresponding to each frequency band to the access point synchronously in response to the data frames in the plurality of frequency bands needing to arrive at the access point synchronously; and a fourth sending submodule 822, configured to send the RTS frames corresponding to each frequency band to the access point asynchronously in response to the data frames in the plurality of frequency bands do not need to arrive at the access point synchronously.

As for the apparatus example, since it basically corresponds to the method example, relevant parts may refer to partial description of the method example. The apparatus example described above is only illustrative. Units described above as separate components may or may not be physically separated, and components displayed as units may or may not be physical units, that is, they may be located in one place, or distributed over a plurality of network units. Some or all of the modules may be selected according to actual needs to achieve the purpose of the disclosure. Those ordinary skilled in the art may understand and implement it without creative effort.

Correspondingly, the disclosure further provides a multi-band communication apparatus. The apparatus is applied to an access point, and includes:

a processor; and a memory configured to store processor-executable instructions.

The processor is configured to:

respectively determine, before sending data frames in a plurality of frequency bands, request to send (RTS) frames that are in a preset format and correspond to each frequency band; and send the RTS frames corresponding to each frequency band to a station.

Figure 30:
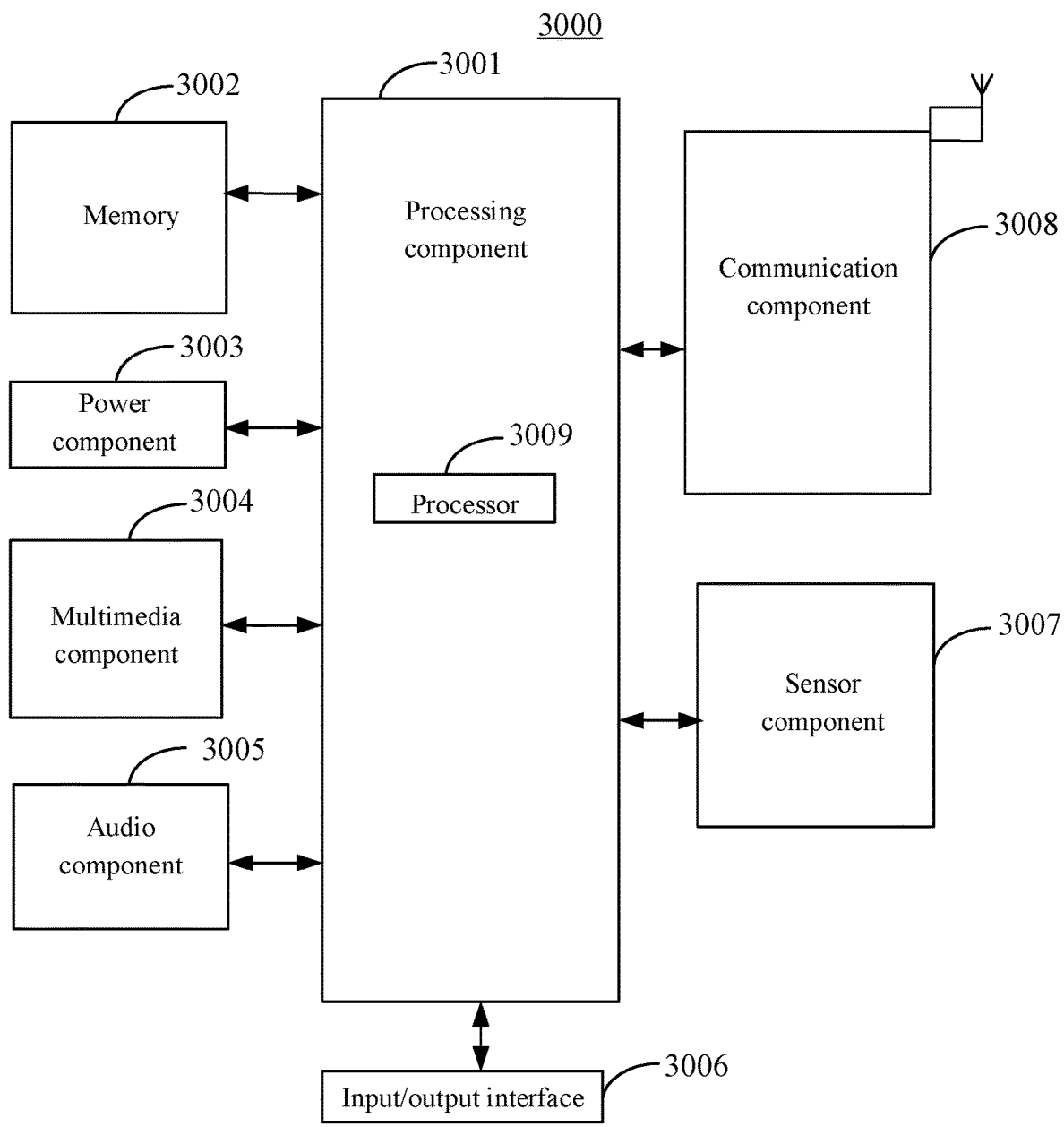
FIG. 30 is a schematic structural diagram of a multi-band communication apparatus according to an example of the disclosure.

FIG. 30 is a structural schematic diagram of a multi-band communication apparatus according to an example. FIG. 30 shows the multi-band communication apparatus 3000 according to an example. The apparatus 3000 may be an access point, for example, a computer, a mobile phone, a digital broadcasting terminal, a messaging device, a game console, a tablet device, a medical device, a fitness device, and a personal digital assistant, etc.

Referring to FIG. 30, the apparatus 3000 may include one or more of the following components: a processing component 3001, a memory 3002, a power component 3003, a multimedia component 3004, an audio component 3005, an input/output (I/O) interface 3006, a sensor component 3007, and a communication component 3008.

The processing component 3001 generally controls overall operations of the apparatus 3000, such as operations associated with display, telephone calls, data communications, camera operations, and recording operations. The processing component 3001 may include one or more processors 3009 to execute instructions to complete all or part of the steps of the above method. In addition, the processing component 3001 may include one or more modules to facilitate interactions between the processing component 3001 and other components. For example, the processing component 3001 may include a multimedia module to facilitate interactions between the multimedia component 3004 and the processing component 3001.

The memory 3002 is configured to store various types of data to support the operations of the apparatus 3000. Instances of such data include instructions for any application or method operating on the apparatus 3000, contact data, phone book data, messages, pictures, videos, etc. The memory 3002 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 3003 provides power for various components of the apparatus 3000. The power component 3003 may include a power management system, one or more power supplies, and other components associated with generating, managing, and distributing power to the apparatus 3000.

The multimedia component 3004 includes a screen that provides an output interface between the apparatus 3000 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, swiping, and gestures on the touch panel. The touch sensor may not only sense a boundary of a touch or swiping action, but also detect duration and pressure related to a touch or swiping operation. In some examples, the multimedia component 3004 includes a front camera and/or a rear camera. When the apparatus 3000 is in an operation mode, such as a shooting mode or a video mode, the front camera and/or the rear camera may receive external multimedia data. Each of the front camera and the rear camera may be a fixed optical lens system or has a focal length and optical zoom capabilities.

The audio component 3005 is configured to output and/or input audio signals. For example, the audio component 3005 includes a microphone (MIC), and when the apparatus 3000 is in an operation mode, such as a call mode, a recording mode, or a voice recognition mode, the microphone is configured to receive external audio signals. The received audio signals may be further stored in the memory 3002 or transmitted via the communication component 3008. In some examples, the audio component 3005 further includes a loudspeaker configured to output the audio signals.

The I/O interface 3006 provides an interface between the processing component 3001 and a peripheral interface module. The above peripheral interface module may be a keyboard, a click wheel, buttons, etc. These buttons may include, but are not limited to: a home button, a volume button, a start button, and a lock button.

The sensor component 3007 includes one or more sensors configured to provide the apparatus 3000 with various aspects of state assessment. For example, the sensor component 3007 may detect an on/off state of the apparatus 3000, and relative positioning of components, such as a display and a keypad of the apparatus 3000. The sensor component 3007 may also detect a position change of the apparatus 3000 or a component of the apparatus 3000, presence or absence of contact between the user and the apparatus 3000, the orientation or acceleration/deceleration of the apparatus 3000, and a temperature change of the apparatus 3000. The sensor component 3007 may include a proximity sensor configured to detect the presence of nearby objects when there is no physical contact. The sensor component 3007 may also include an optical sensor, such as a CMOS or a CCD image sensor, for use in imaging applications. In some examples, the sensor component 3007 may further include an acceleration sensor, a gyroscope sensor, a magnetic sensor, a pressure sensor, or a temperature sensor.

The communication component 3008 is configured to facilitate wired or wireless communications between the apparatus 3000 and other devices. The apparatus 3000 may have an access to a wireless network that is based on a communication standard, such as WiFi, 2G, or 3G, or a combination thereof. In an example, the communication component 3008 receives a broadcast signal or broadcast related information from an external broadcast management system via a broadcast channel. In an example, the communication component 3008 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology and other technologies.

In an example, the apparatus 3000 may be implemented by one or more of application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements to execute the above method.

In an example, a non-transitory computer-readable storage medium including instructions is further provided, such as the memory 3002 including instructions. The above instructions may be executed by the processor 3009 of the apparatus 3000 to complete the above method. For example, the non-transitory computer-readable storage medium may be an ROM, a random access memory (RAM), a CD-ROM, a magnetic tape, a floppy disk, an optical data storage device, etc.

When the instructions in the storage medium are executed by the processor, the apparatus 3000 may be enabled to execute any one of the above multi-band communication methods for the access point side.

Correspondingly, the disclosure further provides a multi-band communication apparatus. The apparatus is applied to a station, and includes: a processor; and a memory configured to store processor-executable instructions. The processor is configured to: respectively determine, before sending data frames in a plurality of frequency bands, request to send (RTS) frames that are in a preset format and correspond to each frequency band; and send the RTS frames corresponding to each frequency band to an access point.

Figure 31:
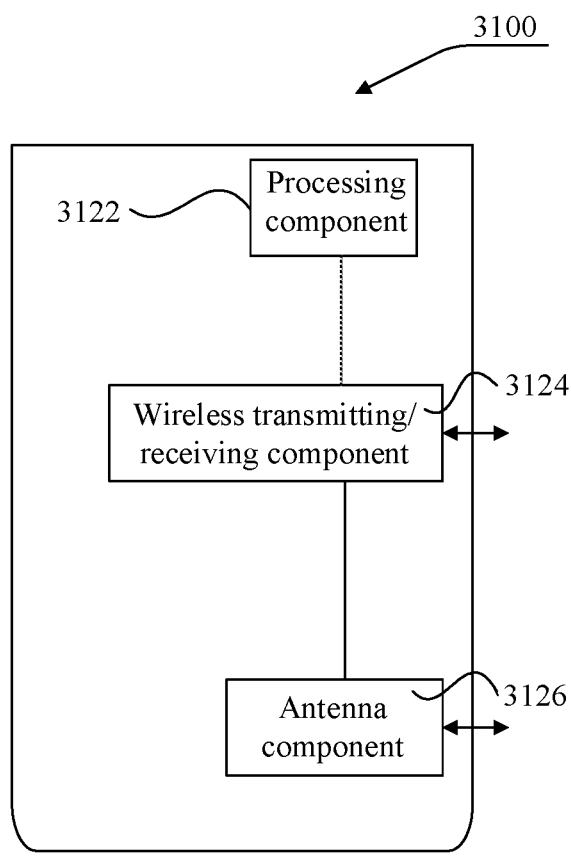
FIG. 31 is a schematic structural diagram of another multi-band communication apparatus according to an example of the disclosure.

As shown in FIG. 31, FIG. 31 is a schematic structural diagram of another multi-band communication apparatus 3100 according to an example. The apparatus 3100 may be provided as a station, such as a base station. Referring to FIG. 31, the apparatus 3100 includes a processing component 3122, a wireless transmitting/receiving component 3124, an antenna component 3126, and a signal processing part specific to a wireless interface. The processing component 3122 may further include one or more processors.

One of the processors in the processing component 3122 may be configured to perform any one of the above multi-band communication methods for the station side.

The technical solution provided by the examples of the disclosure may possess the following beneficial effects.

In the examples of the disclosure, the access point may respectively determine, before sending the data frames in the plurality of frequency bands, the RTS frames that are in the preset format and correspond to each frequency band, and then send the RTS frames corresponding to each frequency band to the station. The purpose of preventing, during multi-band communication, hidden nodes from interfering with a communication requirement by means of an RTS mechanism is achieved, and the throughput of a system is improved.

In the examples of the disclosure, the access point may set transmitter addresses that are different from each other and receiver addresses that are same with each other in the RTS frames corresponding to each frequency band, achieving the multi-band communication, which is easy to implement and has high usability.

In the examples of the disclosure, the access point may randomly generate the transmitter addresses that are different from each other in the RTS frames corresponding to each frequency band, which has high availability.

In the examples of the disclosure, in response to the data frames in the plurality of frequency bands needing to arrive at the station synchronously, the access point needs to set, in the RTS frames corresponding to each frequency band, values of first target domains to be the first target values that are same with each other. In response to the data frames in the plurality of frequency bands do not need to arrive at the station synchronously, the access point may set, in the RTS frames corresponding to each frequency band, the values of the first target domains to be second target values that are different from each other. The first target domain is a domain configured to represent a duration value of the RTS frame. In the examples of the disclosure, in response to the data frames in the plurality of frequency bands needing to arrive at the station synchronously, it is ensured that the data frames in the plurality of frequency bands may arrive at the station synchronously by setting the values of the first target domains to be the first target values that are same with each other, which is easy to implement and has high availability. In addition, during multi-band asynchronous communication, the values of the first target domains in the RTS frames corresponding to each frequency band may be the second target values that are different from each other, making the multi-band asynchronous communication more flexible.

In the examples of the disclosure, in response to the data frames in the plurality of frequency bands needing to arrive at the station synchronously, the access point may respectively calculate, for each frequency band, ratios of the quantity of data to be transmitted to a transmission rate indicated by a modulation and coding scheme, and use a maximum value among the ratios as the values of the first target domains, so as to ensure that the RTS frames corresponding to each frequency band may arrive at a receiver synchronously.

In the examples of the disclosure, in response to the data frames in the plurality of frequency bands do not need to arrive at the station synchronously, the access point may respectively calculate, for each frequency band, ratios of the quantity of data to be transmitted to a transmission rate indicated by a modulation and coding scheme, and use the ratios corresponding to each frequency band as the second target values of the frequency band, which has high availability.

In the examples of the disclosure, in response to the quantity of data frames to be sent in a current frequency band being 1, a sum of a duration value of the RTS frame, a duration value of a clear to send (CTS) frame, a duration value of the data frame, a duration value of feedback information and a duration value of three short interframe spaces may be used as the ratio corresponding to the current frequency band. In response to the quantity of the data frames to be sent in the current frequency band being n, a sum of the duration value of the RTS frame, the duration value of the CTS frame, a duration value of n data frames, the duration value of the feedback information, the duration value of the three short interframe spaces and a duration value of n short interframe spaces is used as the ratio. n is a positive integer greater than 1. Further, during multi-band synchronous communication, the maximum value among the ratios is used as the values of the first target domains in the RTS frames corresponding to the plurality of frequency bands, and during multi-band asynchronous communication, the calculated ratios may be directly used as the values of the first target domains in the RTS frames corresponding to each frequency band, so the availability is high.

In the examples of the disclosure, in response to the data frames in the plurality of frequency bands needing to arrive at the station synchronously and the transmission rates indicated by the modulation and coding schemes corresponding to the plurality of frequency bands being the same, the access point may firstly determine a maximum duration value of the quantity of the data to be transmitted in the plurality of frequency bands. If a duration value of the quantity of data to be transmitted in at least one frequency band is smaller than the maximum duration value, a data frame corresponding to the at least one frequency band is filled with preset data of a target duration value. The target duration value is a difference between the maximum duration value and the duration value of the quantity of the data to be transmitted in the at least one frequency band. Through the above process, it is also ensured that the data frames in the plurality of frequency bands may arrive at the station synchronously.

In the examples of the disclosure, in response to the data frames in the plurality of frequency bands needing to arrive at the station synchronously, the access point may set, in the RTS frames corresponding to each frequency band, values of second target domains to be a first preset value corresponding to a type of multi-band synchronous communication. In response to the data frames in the plurality of frequency bands do not need to arrive at the station synchronously, the access point may set, in the RTS frames corresponding to each frequency band, the values of the second target domains to be a second preset value corresponding to a type of multi-band asynchronous communication. The second target domain is a domain configured to represent a type and subtype of the RTS frame. Through the above process, the station may determine whether it currently belongs to the multi-band synchronous communication or the multi-band asynchronous communication according to the values of the second target domains. The purpose of preventing, during the multi-band communication, the hidden nodes from interfering with the communication requirement by means of the RTS mechanism is also achieved, and the throughput of the system is improved.

In the examples of the disclosure, in response to the data frames in the plurality of frequency bands needing to arrive at the station synchronously, the access point may send the RTS frames corresponding to each frequency band to the station synchronously. In response to the data frames in the plurality of frequency bands do not need to arrive at the station synchronously, the access point may send the RTS frames corresponding to each frequency band to the station asynchronously. The purpose of preventing, during the multi-band communication, the hidden nodes from interfering with the communication requirement by means of the RTS mechanism is achieved, and the throughput of the system is improved.

In the examples of the disclosure, the station may respectively determine, before sending the data frames in the plurality of frequency bands, the RTS frames that are in the preset format and correspond to each frequency band, and then send the RTS frames corresponding to each frequency band to the access point. The purpose of preventing, during the multi-band communication, the hidden nodes from interfering with the communication requirement by means of the RTS mechanism is achieved, and the throughput of the system is improved.

In the examples of the disclosure, the station may set transmitter addresses that are same with each other and receiver addresses that are different from each other in the RTS frames corresponding to each frequency band, which achieves the multi-band communication and is easy to implement and has high availability.

In the examples of the disclosure, the station may randomly generate the receiver addresses that are different from each other in the RTS frames corresponding to each frequency band, which has high availability.

Other implementation solutions of the disclosure will be apparent to those skilled in the art from consideration of the specification and practice of the disclosure disclosed here. The disclosure is intended to cover any variations, uses, or adaptations of the disclosure following the general principles of the disclosure and including common general knowledge or customary technical means in the art that are not disclosed in the disclosure. It is intended that the specification and the examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A multi-band communication method, comprising:
    before sending data frames in a plurality of frequency bands, respectively determining, by an access point, request to send (RTS) frames that are in a preset format and correspond to each frequency band; and
    sending, by the access point, the RTS frames corresponding to each frequency band to a station;
    wherein respectively determining, for the plurality of frequency bands, the request to send (RTS) frames that are in the preset format and correspond to each frequency band, comprises:
    setting transmitter addresses of each frequency band that are different from each other and receiver addresses of each frequency band that are same with each other in the RTS frames that are in the preset format and correspond to each frequency band;
    wherein setting the transmitter addresses that are different from each other comprises:
    randomly generating the transmitter addresses that are different from each other in the RTS frames corresponding to each frequency band.

2. The method according to claim 1, wherein
    respectively determining, for the plurality of frequency bands, the request to send (RTS) frames that are in the preset format and correspond to each frequency band, comprises: in response to the data frames in the plurality of frequency bands needing to arrive at the station synchronously, setting, in the RTS frames corresponding to each frequency band, values of first target domains to be first target values that are same with each other; and in response to the data frames in the plurality of frequency bands do not need to arrive at the station synchronously, setting, in the RTS frames corresponding to each frequency band, the values of the first target domains to be second target values that are different from each other; wherein the first target domain is a domain configured to represent a duration value of the RTS frame; or
    respectively determining, for the plurality of frequency bands, the request to send (RTS) frames that are in the preset format and correspond to each frequency band, comprises: in response to the data frames in the plurality of frequency bands needing to arrive at the station synchronously, setting, in the RTS frames corresponding to each frequency band, values of a second target domains to be a first preset value corresponding to a type of multi-band synchronous communication; and in response to the data frames in the plurality of frequency bands do not need to arrive at the station synchronously, setting, in the RTS frames corresponding to each frequency band, the values of the second target domains to be a second preset value corresponding to a type of multi-band asynchronous communication; wherein the second target domain is a domain configured to represent a type and subtype of the RTS frame.

3. The method according to claim 2, wherein determining the first target values comprises:
    for each frequency band, respectively calculating ratios of the quantity of data to be transmitted to a transmission rate indicated by a modulation and coding scheme; and
    using a maximum value among the ratios as the first target values.

4. The method according to claim 3, wherein determining the ratios corresponding to each frequency band comprises:
    in response to the quantity of data frames to be transmitted in a current frequency band being 1, the ratio is a sum of a duration value of the RTS frame, a duration value of a clear to send (CTS) frame, a duration value of the data frame, a duration value of feedback information and a duration value of three short interframe spaces; and
    in response to the quantity of the data frames to be transmitted in the current frequency band being n, the ratio is a sum of the duration value of the RTS frame, the duration value of the CTS frame, a duration value of n data frames, the duration value of the feedback information, the duration value of the three short interframe spaces and a duration value of n short interframe spaces, wherein n is a positive integer greater than 1.

5. The method according to claim 3, further comprising:
    in response to the transmission rates indicated by the modulation and coding schemes corresponding to the plurality of frequency bands being the same, determining a maximum duration value of the quantity of the data to be transmitted in the plurality of frequency bands; and
    in response to a duration value of the quantity of data to be transmitted in at least one frequency band being smaller than the maximum duration value, filling the data frames corresponding to the at least one frequency band with preset data of a target duration value;
    wherein the target duration value is a difference between the maximum duration value and the duration value of the quantity of the data to be transmitted in the at least one frequency band.

6. The method according to claim 2, wherein determining the second target values comprises:
    for each frequency band, respectively calculating ratios of the quantity of data to be transmitted to a transmission rate indicated by a modulation and coding scheme; and using the ratios corresponding to each frequency band as the second target values corresponding to each frequency band.

7. The method according to claim 6, wherein determining the ratios corresponding to each frequency band comprises:
in response to the quantity of data frames to be transmitted in a current frequency band being 1, the ratio is a sum of a duration value of the RTS frame, a duration value of a clear to send (CTS) frame, a duration value of the data frame, a duration value of feedback information and a duration value of three short interframe spaces; and
in response to the quantity of the data frames to be transmitted in the current frequency band being n, the ratio is a sum of the duration value of the RTS frame, the duration value of the CTS frame, a duration value of n data frames, the duration value of the feedback information, the duration value of the three short interframe spaces and a duration value of n short interframe spaces, wherein n is a positive integer greater than 1.

8. A multi-band communication method, applied to a station, and comprising:
before sending data frames in a plurality of frequency bands, respectively determining request to send (RTS) frames that are in a preset format and correspond to each frequency band; and
sending the RTS frames corresponding to each frequency band to an access point;
wherein respectively determining, for the plurality of frequency bands, the request to send (RTS) frames that are in the preset format and correspond to each frequency band, comprises:
setting transmitter addresses of each frequency band that are same with each other and receiver addresses of each frequency band that are different from each other in the RTS frames that are in the preset format and correspond to each frequency band;
wherein setting the receiver addresses that are different from each other comprises:
randomly generating the receiver addresses that are different from each other in the RTS frames corresponding to each frequency band.

9. The method according to claim 8, wherein
respectively determining, for the plurality of frequency bands, the request to send (RTS) frames that are in the preset format and correspond to each frequency band, comprises: in response to the data frames in the plurality of frequency bands needing to arrive at the access point synchronously, setting, in the RTS frames corresponding to each frequency band, values of first target domains to be first target values that are same with each other; and in response to the data frames in the plurality of frequency bands do not need to arrive at the access point synchronously, setting, in the RTS frames corresponding to each frequency band, the values of the first target domains to be second target values that are different from each other; wherein the first target domain is a domain configured to represent a duration value of the RTS frame; or
respectively determining, for the plurality of frequency bands, the request to send (RTS) frames that are in the preset format and correspond to each frequency band, comprises: in response to the data frames in the plurality of frequency bands needing to arrive at the access point synchronously, setting, in the RTS frames corresponding to each frequency band, values of second target domains to be a first preset value corresponding to a type of multi-band synchronous communication; and in response to the data frames in the plurality of frequency bands do not need to arrive at the access point synchronously, setting, in the RTS frames corresponding to each frequency band, the values of the second target domains to be a second preset value corresponding to a type of multi-band asynchronous communication; wherein the second target domain is a domain configured to represent a type and subtype of the RTS frame.

10. The method according to claim 9, wherein determining the first target values comprises:
for each frequency band, respectively calculating ratios of the quantity of data to be transmitted to a transmission rate indicated by a modulation and coding scheme; and
using a maximum value among the ratios as the first target values.

11. The method according to claim 10, wherein determining the ratios corresponding to each frequency band comprises:
in response to the quantity of data frames to be transmitted in a current frequency band being 1, the ratio is a sum of a duration value of the RTS frame, a duration value of a clear to send (CTS) frame, a duration value of the data frame, a duration value of feedback information and a duration value of three short interframe spaces; and
in response to the quantity of the data frames to be transmitted in the current frequency band being n, the ratio is a sum of the duration value of the RTS frame, the duration value of the CTS frame, a duration value of n data frames, the duration value of the feedback information, the duration value of the three short interframe spaces and a duration value of n short interframe spaces, wherein n is a positive integer greater than 1.

12. The method according to claim 10, further comprising:
in response to the transmission rates indicated by the modulation and coding schemes corresponding to the plurality of frequency bands being the same, determining a maximum duration value of the quantity of the data to be transmitted in the plurality of frequency bands; and
in response to a duration value of the quantity of data to be transmitted in at least one frequency band being smaller than the maximum duration value, filling the data frames corresponding to the at least one frequency band with preset data of a target duration value;
wherein the target duration value is a difference between the maximum duration value and the duration value of the quantity of the data to be transmitted in the at least one frequency band.

13. The method according to claim 9, wherein determining the second target values comprises:
for each frequency band, respectively calculating ratios of the quantity of data to be transmitted to a transmission rate indicated by a modulation and coding scheme; and
using the ratios corresponding to each frequency band as the second target values corresponding to each frequency band.

14. The method according to claim 13, wherein determining the ratios corresponding to each frequency band comprises:
in response to the quantity of data frames to be transmitted in a current frequency band being 1, the ratio is a sum of a duration value of the RTS frame, a duration value of a clear to send (CTS) frame, a duration value of the data frame, a duration value of feedback information and a duration value of three short interframe spaces; and in response to the quantity of the data frames to be transmitted in the current frequency band being n, the ratio is a sum of the duration value of the RTS frame, the duration value of the CTS frame, a duration value of n data frames, the duration value of the feedback information, the duration value of the three short interframe spaces and a duration value of n short interframe spaces, wherein n is a positive integer greater than 1.

15. A multi-band communication apparatus, applied to an access point, and comprising:
   at least one processor; and
   a memory configured to store processor-executable instructions;
   wherein the at least one processor is configured to:
   respectively determine request to send (RTS) frames that are in a preset format and correspond to each of a plurality of frequency bands before sending data frames in the plurality of frequency bands; and
   send the RTS frames corresponding to each frequency band to a station;
   wherein respectively determining, for the plurality of frequency bands, the request to send (RTS) frames that are in the preset format and correspond to each frequency band, comprises:
   setting transmitter addresses of each frequency band that are different from each other and receiver addresses of each frequency band that are same with each other in the RTS frames that are in the preset format and correspond to each frequency band;
   wherein setting the transmitter addresses that are different from each other comprises:
   randomly generating the transmitter addresses that are different from each other in the RTS frames corresponding to each frequency band.

16. A multi-band communication apparatus, applied to a station, and comprising:
   at least one processor; and
   a memory configured to store processor-executable instructions;
   wherein the at least one processor is configured to implement the steps of the multi-band communication method according to claim 8.

* * * * *